United States Patent
Cooper

(10) Patent No.: US 8,806,996 B2
(45) Date of Patent: Aug. 19, 2014

(54) SYSTEM AND METHOD OF AN AUTOMATED ROLL SIZING MACHINE

(75) Inventor: Marc I. Cooper, Beverly, MA (US)

(73) Assignee: The Fiber Resource Group, Inc., Beverly, MA (US)

(*) Notice: Subject to any disclaimer, the term of this patent is extended or adjusted under 35 U.S.C. 154(b) by 889 days.

(21) Appl. No.: 12/958,680

(22) Filed: Dec. 2, 2010

(65) Prior Publication Data

US 2011/0162499 A1    Jul. 7, 2011

Related U.S. Application Data

(60) Provisional application No. 61/265,886, filed on Dec. 2, 2009.

(51) Int. Cl.
| | |
|---|---|
| *B26D 3/16* | (2006.01) |
| *B26D 5/36* | (2006.01) |
| *B65H 19/10* | (2006.01) |
| *B26D 5/32* | (2006.01) |
| *B23D 45/00* | (2006.01) |

(52) U.S. Cl.
CPC ............... *B65H 19/105* (2013.01); *B26D 5/36* (2013.01); *B23D 45/003* (2013.01); *B26D 5/32* (2013.01); *B65H 2511/166* (2013.01)
USPC ................................................. 82/47; 82/113

(58) Field of Classification Search
CPC .......... B23B 5/14; B23D 45/12; B23D 45/02; B23D 1/16; B23D 59/003
USPC .................... 82/46, 47, 113, 101, 92, 83, 70.2
See application file for complete search history.

(56) References Cited

U.S. PATENT DOCUMENTS

| | | | |
|---|---|---|---|
| 5,173,138 A | 12/1992 | Blauch et al. | |
| 5,682,681 A * | 11/1997 | Cincotta et al. | 30/403 |
| 5,885,199 A * | 3/1999 | Shao | 483/19 |
| 5,894,771 A * | 4/1999 | Braun et al. | 82/47 |
| 5,941,144 A * | 8/1999 | Lumberg | 82/70.1 |
| 6,209,430 B1 * | 4/2001 | Desmarais et al. | 82/47 |

(Continued)

FOREIGN PATENT DOCUMENTS

| | | |
|---|---|---|
| JP | 59194967 | 11/1984 |
| WO | WO-2011/068937 A1 | 6/2011 |

OTHER PUBLICATIONS

"International Application Serial No. PCT/US 10/58665,Search Report and Written Opinion mailed Mar. 9, 2011",, 11.

*Primary Examiner* — Will Fridie, Jr.
(74) *Attorney, Agent, or Firm* — GTC Law Group LLP & Affiliates

(57) ABSTRACT

In embodiments of the present invention improved capabilities are described for a paper roll resizing system. The paper roll resizing system may include a shafted roll stand that suspends a roll of paper mounted horizontally, wherein the shafted roll stand is fixed to a machine housing and is adapted to spin the roll of paper. Alternatively, the roll stand suspends the roll of paper mounted horizontally from two chucks on opposite ends of the roll. The system further includes a cutting tool movably mounted to the roll stand, wherein the cutting tool comprises at least one of a milling head, a planing head, a circular saw, and a laser cutting tool. A controller (PLC) may adjust the position of the cutting tool with respect to the roll of paper held by the roll stand.

20 Claims, 33 Drawing Sheets

SHAFTED VERSION

(56) References Cited

U.S. PATENT DOCUMENTS

| | | | |
|---|---|---|---|
| 6,516,694 B1 * | 2/2003 | Easton et al. | 83/54 |
| 2001/0040683 A1 | 11/2001 | Hofman | |
| 2004/0244549 A1 | 12/2004 | Mitchell et al. | |
| 2008/0023126 A1 | 1/2008 | Hould et al. | |

* cited by examiner

REAR ISO VIEW: SHELL MILL, CORE CHUCKS, KICKERS, SAW, LIFT TABLE

REAR ISO VIEW: PLANER HEAD, CORE CHUCKS, SAW, KICKERS, LIFT TABLE

RIGHT HAND VIEW: SHELL MILL, SHAFTED, COMPLETE ASSEMBLY

FIG. 6 RIGHT HAND VIEW: SHELL MILL, SHAFTED, w/o SAW OR KICKERS

RIGHT HAND VIEW: SHELL MILL, CORE CHUCKS, w/o SAW OR KICKERS

ISO VIEW: SHELL MILL, CORE CHUCKS, LIFT TABLE

RIGHT VIEW: SHELL MILL, CORE CHUCKS, LIFT TABLE

END VIEW: SHELL MILL, CORE CHUCKS, LIFT TABLE, w/o SAW OR KICKERS

RIGHT VIEW: PLANER HEAD, CORE CHUCKS, LIFT TABLE

REAR ISO VIEW: PLANER HEAD, CORE CHUCKS, LIFT TABLE

ISO VIEW: PLANER HEAD, CORE CHUCKS, LIFT TABLE

ISO VIEW: SHELL MILL, SHAFTED, COMPLETE ASSEMBLY WITH PAPER ROLL

RIGHT HAND VIEW: SHELL MILL, SHAFTED, COMPLETE ASSEMBLY WITH PAPER ROLL

END VIEW: SHELL MILL, SHAFTED, COMPLETE ASSEMBLY WITH PAPER ROLL

TOP VIEW: SHELIX MILL, CORE CHUCKS, LIFT TABLE

END VIEW: PLANER HEAD, CORE CHUCKS, LIFT TABLE

2000

RIGHT VIEW: PLANER HEAD, SHAFTED, LIFT TABLE

TOP VIEW: PLANER HEAD, SHAFTED, LIFT TABLE

ISO VIEW: PLANER HEAD, SHAFTED, LIFT TABLE

REAR ISO VIEW: PLANER HEAD, SHAFTED, LIFT TABLE, w/o SAW OR KICKERS

RIGHT VIEW: SHELL MILL, SHAFTED, LIFT TABLE

TOP VIEW: SHELL MILL, SHAFTED, LIFT TABLE

REAR ISO VIEW: SHELL MILL, SHAFTED, LIFT TABLE, w/o SAW OR KICKERS

ISO VIEW: SHELL MILL, SHAFTED, LIFT TABLE

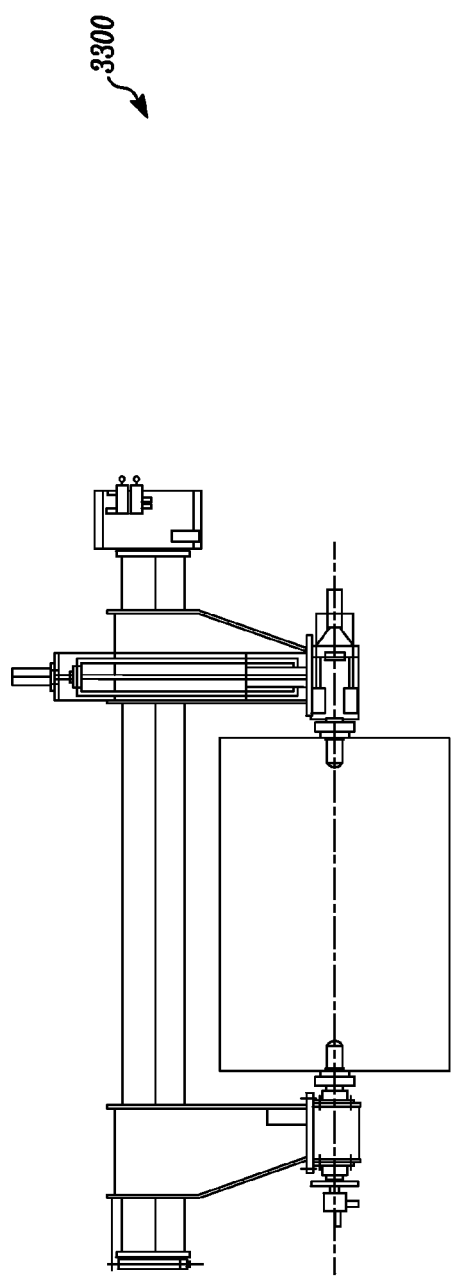
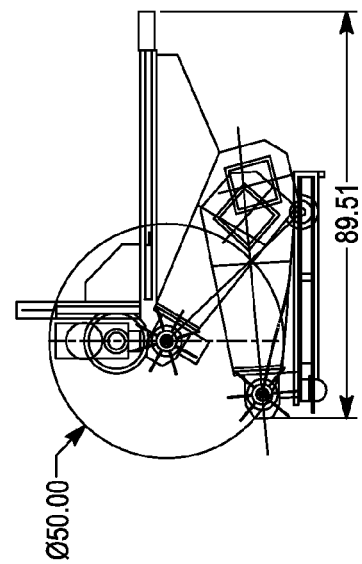
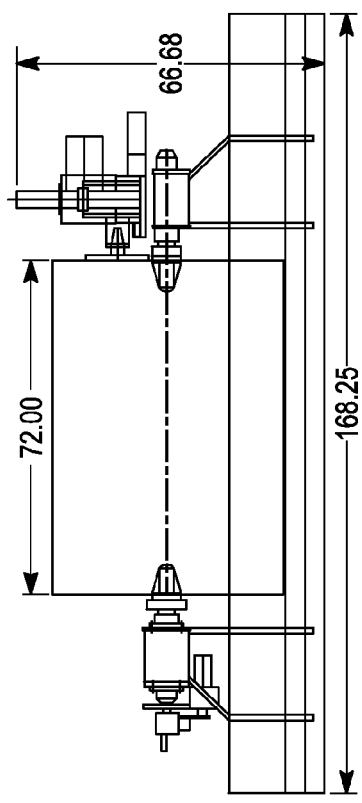
FIG. 33A
FIG. 33B
FIG. 33C

SYSTEM AND METHOD OF AN AUTOMATED ROLL SIZING MACHINE

CROSS-REFERENCE TO RELATED APPLICATIONS

This application claims the benefit of U.S. Provisional Patent Application No. 61/265,886, filed Dec. 2, 2009, the entirety of which is hereby incorporated by reference.

BACKGROUND

1. Field

This invention relates to the field of roll sizing, particularly with respect to paper rolls as well as other substrates such as plastic, film, and the like.

2. Description of the Related Art

A paper rewinder is the most commonly used technology in the paper industry for changing and reducing the width of a paper roll. In this process, the roll is unwound from its original core and size and rewound onto a new core and width through a series of large rollers, while circular slitters are used to trim the desired amount of paper from the roll width or cut it to the desired size(s). The rewinding process consumes significant amounts of time and energy since the process requires the entire roll of paper to be unwound and then rewound.

Another means of removing damaged rolls' ends is by using a traditional oversized chain saw or band saw. These methods are widely used in the paper industry to make a rough cut to reduce the total width of a roll, or cut off a wet or damaged portion from the end of the roll. In some cases, the saw-cut roll is adequate for the intended purpose, which may include reprocessing as a raw material or for use in a low end finished product application where precision is not required. However, saw-cut rolls are typically not suitable for applications where a precision cut is required, such as fine paper printing applications.

Alternatively, there are many times after the roll has been cut or the damaged portion of the roll has been removed, that the rough cut roll will be rewound on a paper rewinder. However, as stated, paper rewinding is a timely, costly, and energy-intensive process and may result in a loss of the original manufactured tension, the original core, most or all of the original roll wrapping as well as additional waste generated in the start up from the rewinding process.

Thus, there remains a need for an alternative cost efficient, effective, and precise way to re-size paper rolls.

SUMMARY

Disclosure herein relates to resizing a finished roll of paper using a number of automated and manual techniques, including those suitable for CNC milling in the metal industry and planing common to the forest products and woodworking industries.

In an aspect of the invention, a paper roll resizing system may include a shafted or shaftless roll stand that suspends a roll of paper mounted horizontally, wherein the roll stand is fixed to a machine housing and is adapted to spin the roll of paper, a cutting tool movably mounted to the shafted roll stand, wherein the cutting tool comprises at least one of a milling head, a planing head, and a circular saw, and a controller (PLC) that adjusts the position of the cutting tool with respect to the roll of paper held by the shafted or shaftless roll stand. The system may further include a laser or other measuring mechanism attached to the roll stand, wherein the laser or other device is adapted to check roundness of the paper roll. The resizing system may be installed as a permanent fixture or built to be portable. The PLC may control one or more of the depth of the cut, detailed roll or workpiece specifications, selection of cutting process, development and speed of the cutting path, cutting tool size and rotation speed, speed of the cutting tool traveling along the face of the workpiece, the angle of the cutting tool with respect to the roll end, rotation speed and rotation direction. The system may be installed above or below floor level. The roll may be lifted into position by traditional material handling equipment or one or more lift table(s) or arms. Optional sensors attached to the roll stand/system frame and electronically connected to the PLC may determine at least one of if a roll is out-of-round, the distance to the roll from the cutting tool, and the depth of a cut.

In an aspect of the invention, a paper roll resizing system may include a shafted or shaftless roll stand that suspends a roll of paper mounted horizontally, wherein the shafted or shaftless roll stand is fixed to a machine housing and is adapted to spin the roll of paper, an arm movably mounted to the shafted roll stand, wherein the arm is adapted to hold a laser cutting tool, and a controller (PLC) that adjusts the position of the arm with respect to the roll of paper held by the roll stand. The laser cutting tool may be further adapted to check roundness of the paper roll. The arm may rotate around the roll. The arm may be fixed while the roll spins. The laser may be further adapted to check roundness of the paper roll. The resizing system may be portable. The PLC may control one or more of the depth of the cut, detailed roll specifications, selection of cutting tool, development of the cutting path, cutting tool rotation speed, speed of the head traveling along the face of the roll, an angle of a blade on the cutting tool or the angle of the cutting tool with respect to the roll end, shaft rotation speed and shaft rotation direction. The system may be installed below floor level. The roll may be lifted into position by a lift table or arms. Sensors attached to the roll stand and electronically connected to the PLC may determine at least one of if a roll is out-of-round, the distance to the roll from the cutting tool and the depth of a cut.

In an aspect of the invention, a paper roll resizing system may include a shaftless roll stand that suspends a roll of paper mounted horizontally from two chucks on opposite ends of the roll, wherein the roll stand is fixed to a machine housing and is adapted to spin the roll of paper, a cutting tool movably mounted to the roll stand, wherein the cutting tool comprises at least one of a milling head, a planing head, a circular saw, and a laser cutting tool, and a controller (PLC) that adjusts the position of the cutting tool with respect to the roll of paper held by the roll stand. The laser cutting tool may further be adapted to check roundness of the paper roll. The laser may be further adapted to check roundness of the paper roll. The resizing system may be portable. The PLC may control one or more of the depth of the cut, detailed roll specifications, selection of cutting tool, development of the cutting path, cutting tool rotation speed, speed of the head traveling along the face of the roll, an angle of a blade on the cutting tool or the angle of the cutting tool with respect to the roll end, chuck rotation speed and chuck rotation direction. The system may be installed below floor level. The roll may be lifted into position by a lift table or retractable arms. Sensors attached to the roll stand and electronically connected to the PLC may determine at least one of if a roll is out-of-round, the distance to the roll from the cutting tool, the depth of a cut, and a paper type.

These and other systems, methods, objects, features, and advantages of the present invention will be apparent to those skilled in the art from the following detailed description of the preferred embodiment and the drawings. All documents mentioned herein are hereby incorporated in their entirety by reference.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The invention and the following detailed description of certain embodiments thereof may be understood by reference to the following figures:

FIG. 33 depicts an embodiment of a roll sizing system.

DETAILED DESCRIPTION

The present invention relates to a simple, fast, precise and cost-effective method for resizing paper rolls as well as repairing damaged, wet, dirty or saw-cut roll ends while leaving a smooth edge in a single or multi-step, automated and/or manual process. After performing the resizing process, the resized roll may not require an additional finishing process depending on the desired results. In the present invention, a resizing machine may be employed in a stationary or portable capacity.

The current invention can perform the paper roll sizing process on a roll of paper that is either in its original form or after it has been cut using one of the saw cutting methods in the prior art. In either case, the roll can be resized without sacrificing the original roll integrity of the remaining portion of the finished roll, such as but not limited to roll diameter, original manufactured tension, original core and most of the original roll wrapping and packaging, if desired.

The roll resizing system represents a unique and novel application of milling, planing and sawing technology applied to fiber. The process and equipment described dramatically reduces resizing time and energy consumption when compared to traditional paper rewinding. The roll resizing system may be embodied in a machine made to be stationary or portable and transported via truck to provide the same benefits on-site as at a customer location. The roll resizing system may include flexible and expandable sections, rigidity and components to customize and adhere to the unique and varying needs of customers, such as paper mills, printers, warehouses or paper converters, based on their logistical requirements, constraints, and roll sizing needs. In an embodiment, the roll resizing system may include a shaft (FIG. 3) or shaftless (FIG. 1) roll stand while positioning the roll in a horizontal fashion such that a cutting tool is able to travel along the edge of the roll to the center and remove a predefined or manually adjusted depth (FIG. 1) of paper across the face of the roll either from the outside edge toward the center or vice versa. The resizing process may occur in a horizontal or vertical direction across the face of the roll. The roll to be resized may initially exhibit a rough cut made by a saw or maintain the original roll characteristics, prior to being resized using the roll resizing system.

Figure 1:
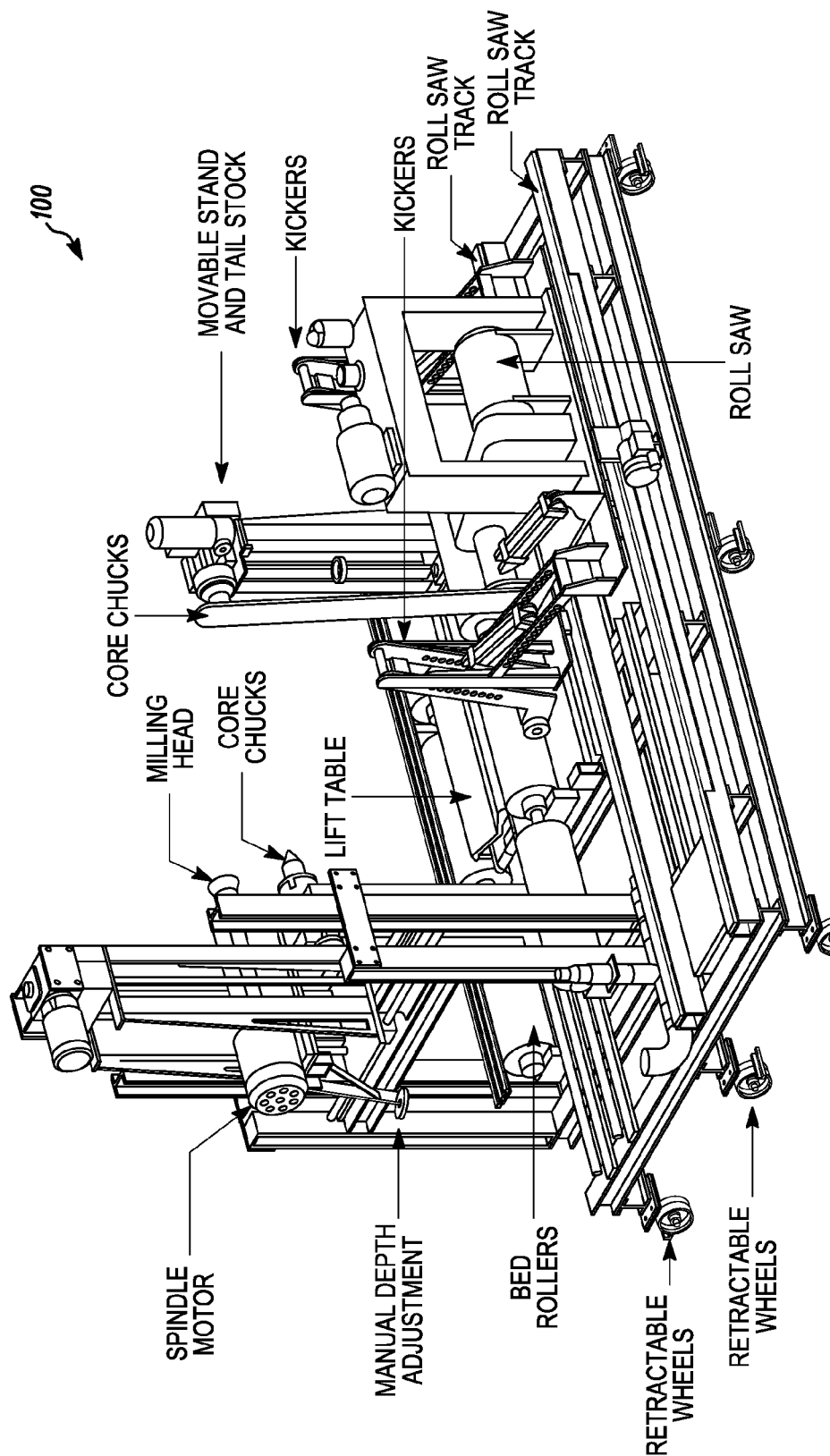
FIG. 1 depicts an embodiment of a roll sizing system: REAR ISO VIEW: shell mill, core chucks, kickers, saw, lift table.

Referring to FIG. 1, a roll sizing system is shown. The view shown in FIG. 1 is: REAR ISO VIEW: shell mill, core chucks, kickers, saw, lift table. The roll sizing system is suitable for resizing rolls and repair of wet/dirty/damaged roll ends without the need for rewinding. The roll sizing system does not affect roll diameter, original manufactured tension, the original roll core, most of the original roll wrapping and packaging, and the like.

In an embodiment, the roll sizing system may be embodied as a machine and a controller installed permanently or may be used in a portable embodiment. In a permanent installation, the roll sizing system may be installed in/on the floor to enable the roll to be rolled on to the roll stand from floor level. Roll kicker(s) FIG. 1 may or may not be used so as to allow the user to employee the most efficient roll handling customization for their particular operation. If used, the kickers may assist with placing rolls onto and off of the roll sizing machine safely and effectively. If kickers and roll saw are not included (FIG. 7), a roll may be loaded or unloaded onto the resizing machine from either the front or rear side of the machine depending on configuration and inclusion of optional chain saw attachment. In another permanent embodiment, the roll sizing system may be placed higher than floor level. An optional lift table, (FIG. 1) scissor lift, hydraulic arms or the like may be used to raise or lower the roll onto the roll sizing system shaft rather than using a lift truck to pick up the roll.

In another embodiment, a shaftless system may be employed using core chucks positioned in place of the shafted version and are attached to the frame of the system (FIG. 1). The shaftless system allows for either one or two movable roll stands that support the workpiece (FIG. 1) to travel along a track to accommodate roll sizing of different width rolls. (FIG. 29) In both the shafted and shaftless embodiments, two chucks or one shaft may be inserted into the core on either end of the roll and the roll may be lifted into cutting position as described previously herein.

In the portable embodiment, the roll sizing system may be kept in place by the weight of the machine, clamping in expandable sections to increase or decrease the length of the machine, or the like. The roll sizing system may be installed on a trailer for portability. The roll sizing system may have locking wheeled jacks, rollers or wheels, which may be retractable, to enable portability. A hydraulic lift raises the machine to enable the rolling wheels to be retracted.

In any embodiment, kickers or lifts may be placed on either side of the roll saw to help position the roll by elevating or retracting it so that it easily remains level and balanced on the rollers, chucks or shaft.

In an embodiment, the roll may be positioned horizontally on the roll sizing system, (FIG. 30) on either a shaftless or a shafted roll stand where the roll sizing is performed. The horizontal positioning allows the resizing process to proceed even if the rolls are warped or out-of-round, which is a common condition of both first quality and damaged rolls. Because most rolls have some minor or major imperfection, attempting to resize a roll on spinning rollers prevents an even cut across the end or face of the roll. The roll stand may enable suspending the roll in the air such that the roll does not sit on rollers and allows for a perfectly square resizing process to occur, which is critical to many end users of the finished resized roll. A standard or customized shaft or core chucks by which the roll is suspended may be designed to let the cutting tool travel from the edge to the core of the roll or vice versa.

In any event, the roll stand or other device suitable for positioning the roll may be located along a frame of the roll sizing system. The shaft or chucks may be interchangeable and expandable to fit different size cores when inserted into one or both ends of the roll to be resized.

The roll sizing system frame may be rigid in order to dampen vibrations from operation of the system. The frame may include a balancing and leveling mechanism to ensure the roll remains taut and level. The frame may include a tail stop (FIG. 1), which may be a stationary or movable portion of the frame. (FIG. 1) When the roll is raised onto the shaft or shaftless roll stand, the tail stop may be the primary or secondary stand by which the roll is supported. If movable, the tail stop is designed to travel along the rail system built into the frame in order to accommodate the resizing of varied width rolls while performing multiple functions, including but not limited to housing the gearbox that spins the shaft to the desired speed, mounting a secondary cutting or finishing tool to resize or finish both roll ends contemporaneously, and the like. Alternatively, a gearbox for spinning the roll may also be located on the same side of the machine as the spindle head.

In an embodiment, the roll may spin in the same or opposite direction as the cutting tool. Spinning the roll may be accomplished by a driven motor that spins the shaft or spinning may be done manually. (FIG. 1) The motor may be a variable speed or Servo motor. The motor may be under the control of a PLC.

In an embodiment, the finishing, cutting, or resizing tool may be a milling head, a planer blade, a router blade, a circular saw blade, a laser, a sanding head, and the like. (FIG. 1) The cutting tool may have multiple cutting inserts and may accept a side force. The speed of the cutting tool may be under the control of a PLC or may be manually controlled. In an embodiment, the type of cutting tool used may be matched to the paper type on the roll or the desired finish. In an embodiment, one or more multi-depth milling (FIG. 1) and or planing heads (FIG. 2) can be used to reduce or increase the amount of paper to be removed from a roll end. In an embodiment, the cutting tool may move along the face of the roll end to cut in a vertical or horizontal movement. In a vertical configuration the cutting tool travels in a downwards or upward motion from the outside edge towards the core or an upwards or downwards motion from the core to the outside edge. In a horizontal configuration the cutting tool travels in a horizontal from the outside edge to the center of the roll or vice versa. In an embodiment, the cutting tool may be made from any suitable material, such as rigid steel, diamond, carbide, and the like. There may possible variations for the cutting tool, such as the number of cutters on the tool, the angle of the cutting tool, the type of blade on the cutting tool, the angle of the cutting elements, and the like. For example, a milling head or planer useful in the roll sizing system may have a diameter or circumference of less or more than five inches, may have more or less than 5 cutters per head, may have replaceable cutter inserts, may spin at speeds greater or less than 4000 rpm, and the like.

In an embodiment, the cutting tool may be a circular planer.

In an embodiment, the cutting tool may be laser-based. (FIG. 32) The laser may be a $CO_2$ laser. The laser may be oriented such that it cuts the roll end horizontally or vertically. The laser may be stationary while the roll spins on the rollers, shaft or chuck. Alternatively, the laser may spin on a track around a stationary roll. The laser may also be adapted to check for roundness, or out-of-roundness, of the roll. The laser may also be adapted to aid in aligning the roll on the roll sizing system.

In an embodiment, the cutting tool may be mounted on either side of the machine along the roll stand. The depth of cutting may be controlled by moving the cutting tool towards the roll using a PLC or manual setting or adjustments, such as by mounting it on a track of the frame, and across the face of the roll end. Alternatively, the roll may be spun and/or moved towards or away from the cutting tool.

In any event, either one or both of the cutting tool and the roll may spin or move to enable resizing. Parameters associated with the cutting tool, the roll and other elements of the roll sizing system may be controlled by software. Software control may ensure efficiency, precision and repeatability of the resizing process. All cutting parameters, including the depth of the cut, detailed roll specifications, selection of cutting tool, development of the cutting path, cutting tool rotation speed, speed of the head traveling along the face of the roll, the angle of the blade on the cutting tool or the angle of the cutting tool with respect to the roll end, shaft or chuck rotation speed and direction, and the like, may be entered into and/or controlled by a computer-controlled PLC in order to automatically perform the sizing process. For example, if the rotation of the roll is set too slow, burn or burnish marks may be left on the roll end. Conversely, if the speed is set too high the cutting tool may overload and get jammed or suffer from what is referred to as "drag". The speed of the cutting tool may need to be modulated in order to achieve a precise cut that does not result in burning of the paper or jamming of the cutting tool. The speed may be set automatically based on any number of parameters, such as the paper type, depth of the cut, roll size, cutting tool parameters, and the like.

In an embodiment, use of the PLC with the roll sizing system may enable precision cutting control. In addition the roll saw can be automatically or manually set to enable cutting of large rolls into several small rolls. The PLC may employ various formulas for setting the speed of roll turning, the speed of the cutting tool, the depth of the cut, the position of the cutting tool, the position of the roll, automatically determining the position of the cutting tool from the roll, and the like. A memory facility may be associated with the PLC to store roll sizing system parameters and paper types. Sensors associated with the roll sizing system may be used to determine if a roll is out-of-round, check the distance to the roll from the cutting tool, check the depth of cut, and the like. For example, the center of the roll travels at a different speed than the outside of roll. So, the cutting tool rotation speed needs to change to reflect where it is in the pass through the roll from the perimeter to the core. The PLC may control the speed of rotation of either the roll or the cutting tool in order to ensure that a consistent cut is made along the face of the roll. In an embodiment, the PLC may be able to obtain remote assistance and download updates, such as over a network connection.

The roll sizing system may be used to resize any kind of paper or other substrate including plastic, wood, metal, rubber type on a roll. The PLC may have preset controls based on substrate or paper type, roll size, paper density, weight, tendency to tear, thickness, required finish, and the like.

The roll sizing system may have a number of built-in safety features, such as software and hardware operational stops. For example, sensors may alert when the cutting tool has reached the core. In another embodiment, the system may shut down or employ remediation, such as an exhaust system or a cooling system to mitigate smoke, heat, fire, and the like.

In an embodiment, an attached, integral or offline saw may make an initial rough cut to reduce the total roll size. For example, an elongated chain saw blade may cut through the entire roll, only spinning it enough to cut through the entire diameter of the roll. Roll stops may be used to prevent "walking" while spinning the roll on rollers in order to insure a straight and accurate cut using the saw. The saw may be rail-mounted in order to adjust cutting position and may be manually, laser or electronic precision guided.

In an embodiment, a vacuum system may be associated with the roll sizing system. The vacuum system may remove all swarf and trimmings as they are generated by the cutting tool and/or saw. The vacuum system may be flexible and scalable. The vacuum inputs for the system may be placed at various places along the roll sizing system, such as below the roll, below the cutting tool, above the cutting tool, behind the cutting or sanding tool, beneath the frame and the like.

In an embodiment, core straightening or fixing mechanisms may be employed when the core is warped or crushed. For example, while placed on the roll sizing system, a circular mechanism may be forcibly inserted that expands and enables the core to take on its original shape.

In an embodiment, the rolls may be optionally finished with an additional process after resizing with the roll sizing system. For example, an additional sanding or finishing head may be employed to achieve a final finish on the roll end. Furthermore, the additional sanding mechanism may be installed in order to resize the roll and then perform a finishing process without removing the resizing cutting mechanism (not shown).

Figure 2:
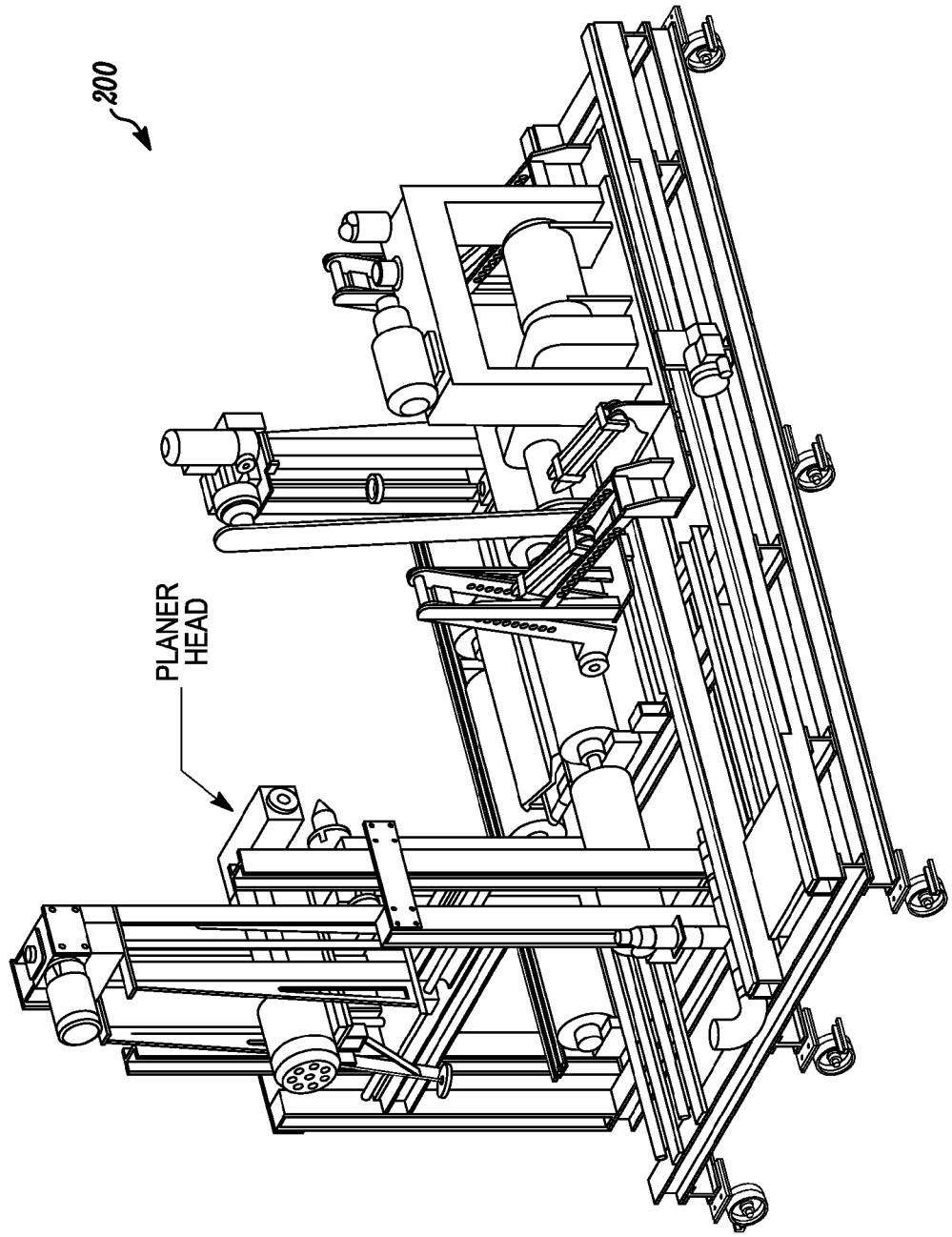
FIG. 2 depicts an embodiment of a roll sizing system: REAR ISO VIEW: Planer Head, core chucks, saw, kickers, lift table.

Referring to FIG. 2, the roll sizer embodiment depicted is: REAR ISO VIEW: Planer Head, core chucks, saw, kickers, lift table.

Figure 3:
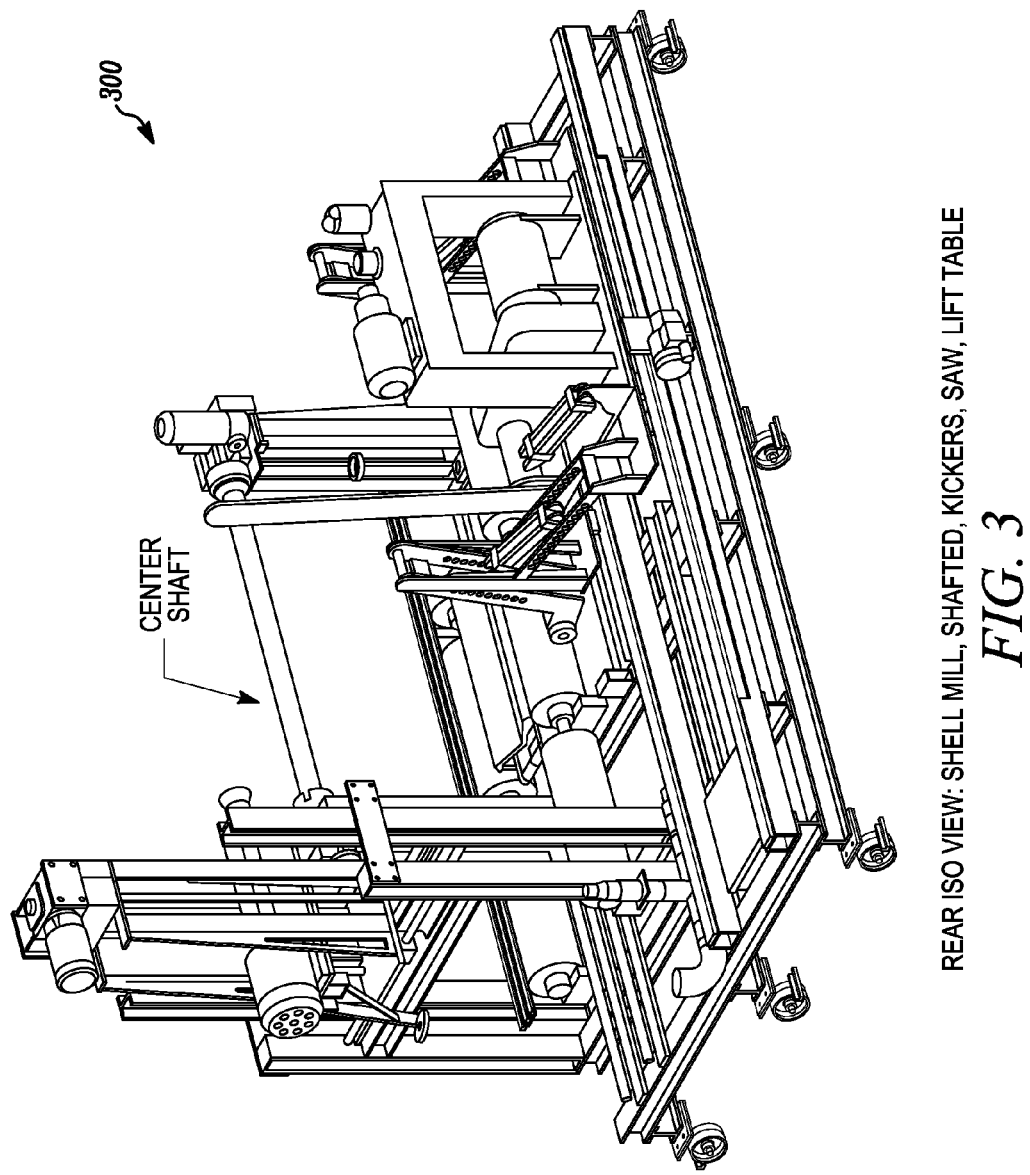
FIG. 3 depicts an embodiment of a roll sizing system: REAR ISO VIEW: shell mill, shafted, kickers, saw, lift table.

Referring to FIG. 3, the roll sizer embodiment depicted is: REAR ISO VIEW: shell mill, shafted, kickers, saw, lift table.

Figure 4:
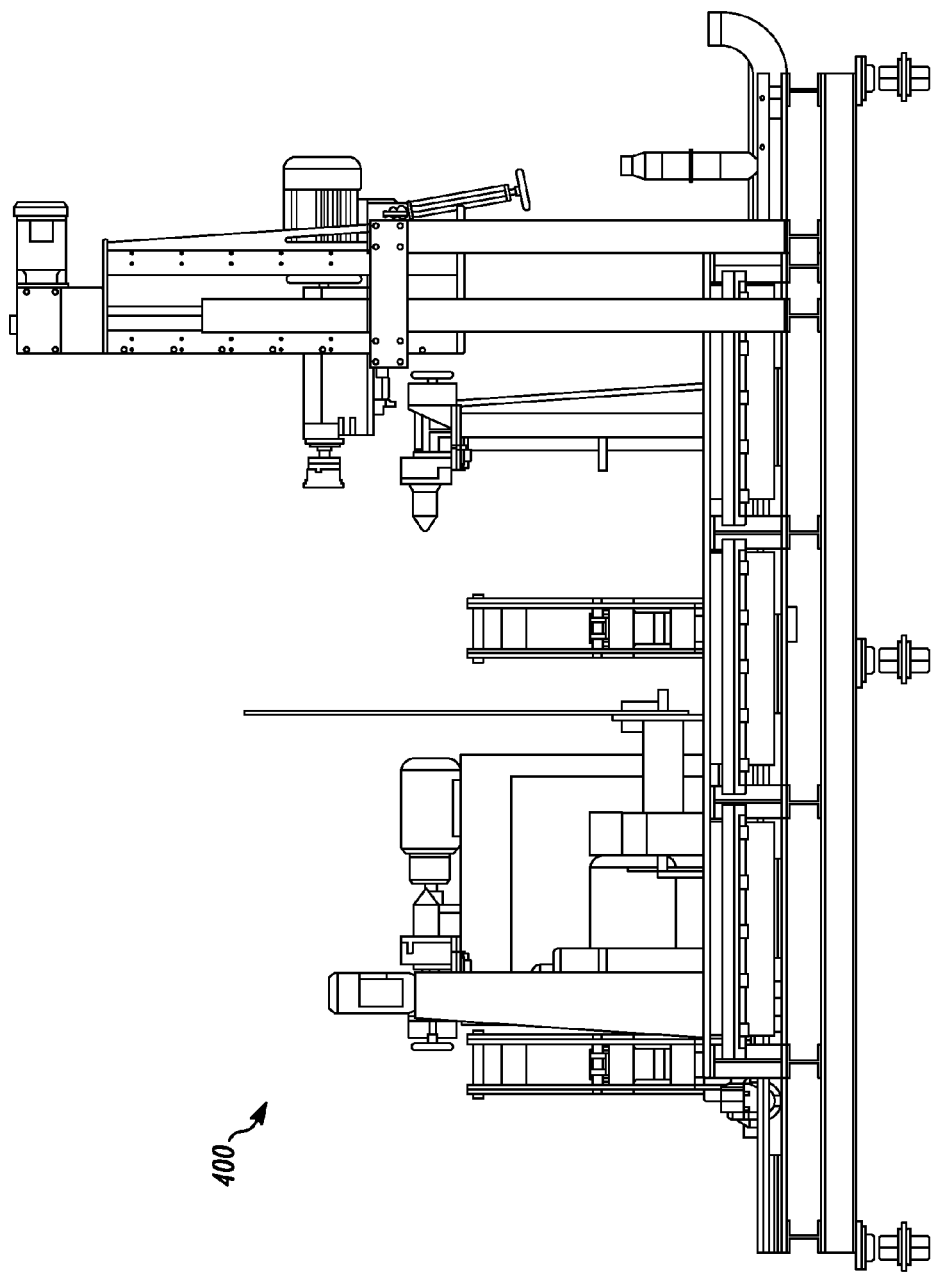
FIG. 4 depicts an embodiment of a roll sizing system: RIGHT HAND VIEW: shell mill, core chucks, complete assembly.

Referring to FIG. 4, the roll sizer embodiment depicted is: RIGHT HAND VIEW: shell mill, core chucks, complete assembly.

Figure 5:
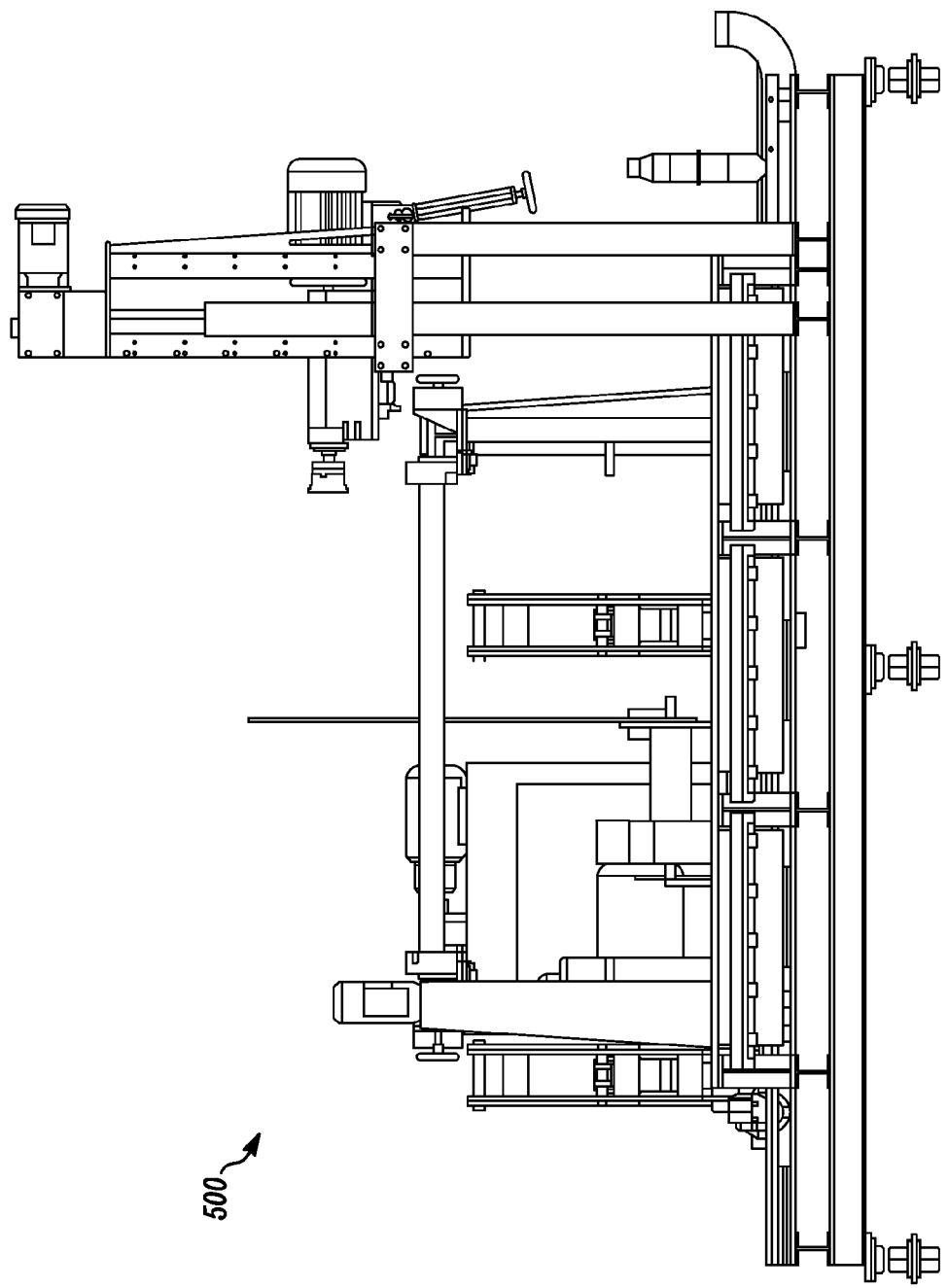
FIG. 5 depicts an embodiment of a roll sizing system: RIGHT HAND VIEW: shell mill, shafted, complete assembly.

Referring to FIG. 5, the roll sizer embodiment depicted is: RIGHT HAND VIEW: shell mill, shafted, complete assembly.

Figure 6:
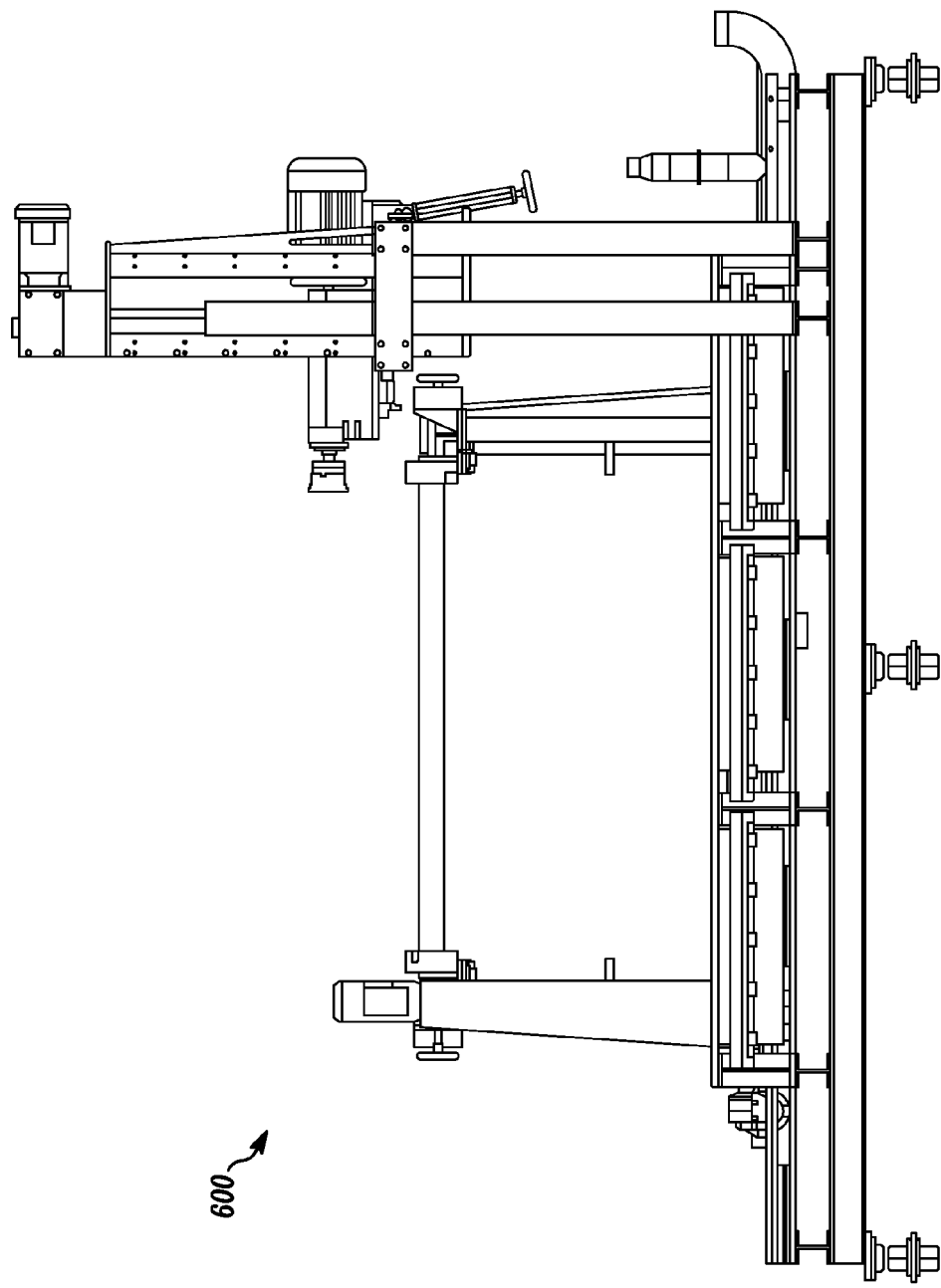
FIG. 6 depicts an embodiment of a roll sizing system: RIGHT HAND VIEW: shell mill, shafted, w/o saw or kickers.

Referring to FIG. 6, the roll sizer embodiment depicted is: RIGHT HAND VIEW: shell mill, shafted, w/o saw or kickers.

Figure 7:
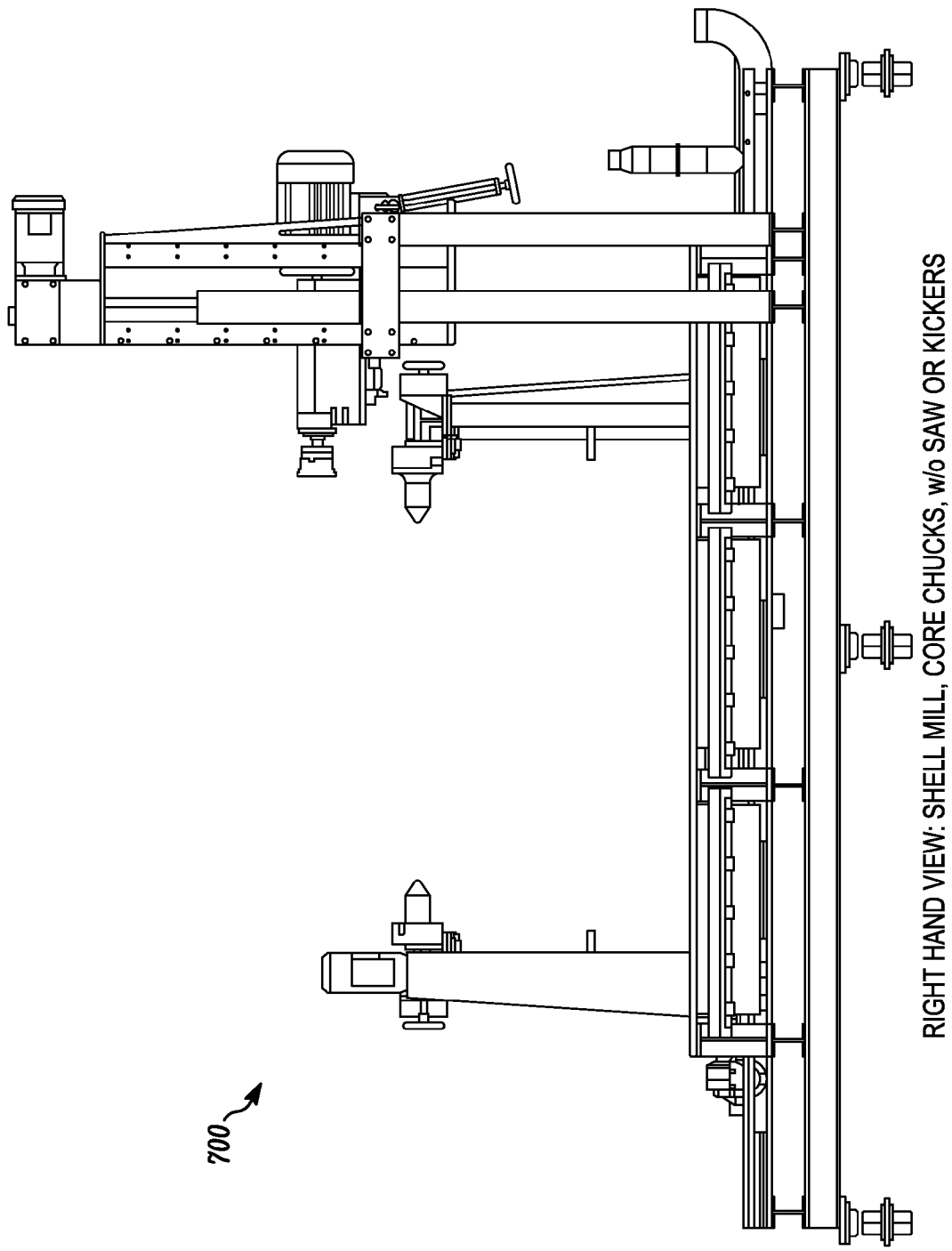
FIG. 7 depicts an embodiment of a roll sizing system: RIGHT HAND VIEW: shell mill, core chucks, w/o saw or kickers.

Referring to FIG. 7, the roll sizer embodiment depicted is: RIGHT HAND VIEW: shell mill, core chucks, w/o saw or kickers.

Figure 8:
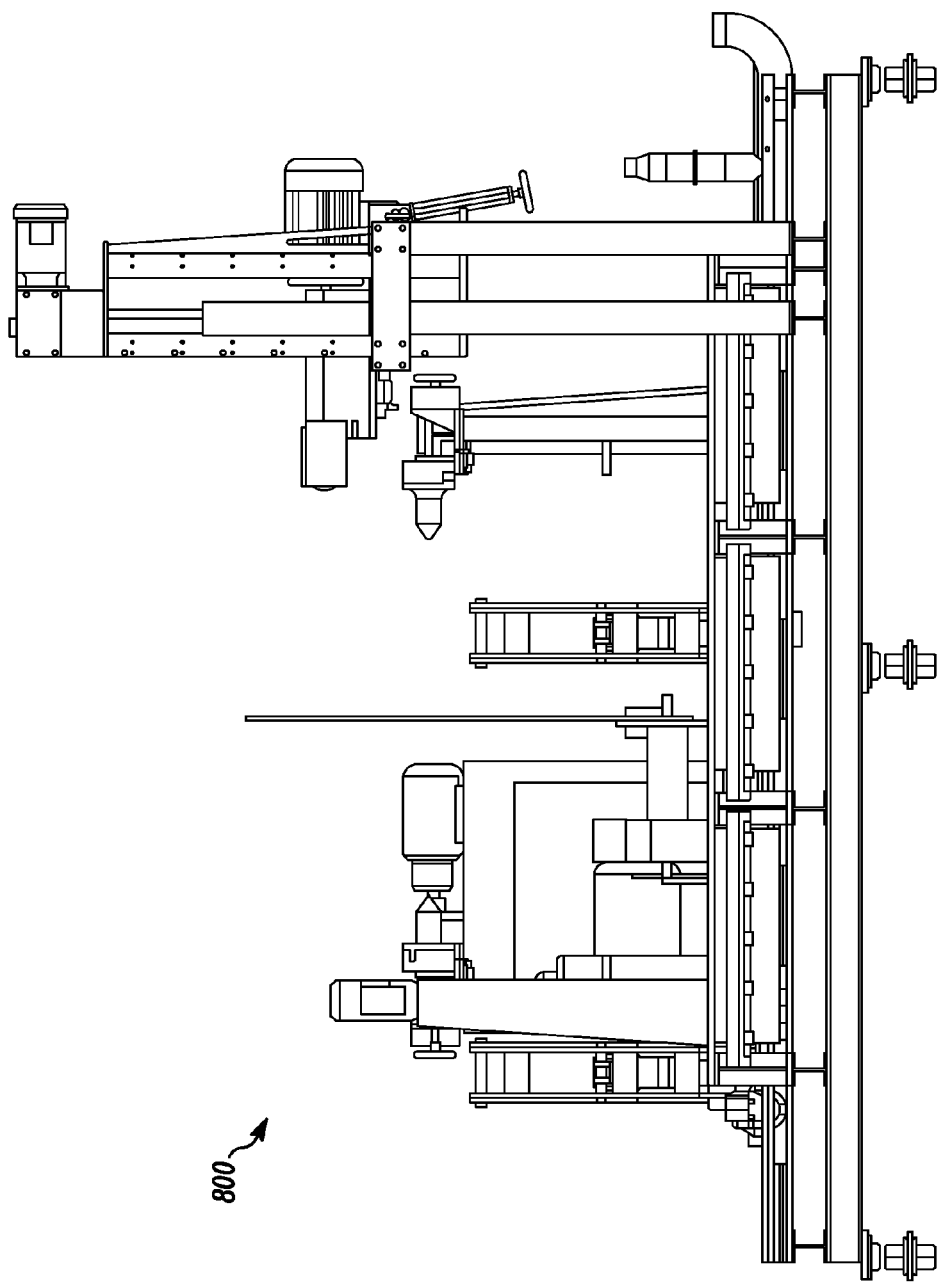
FIG. 8 depicts an embodiment of a roll sizing system: RIGHT HAND VIEW: Planer Head, core chucks, complete assembly.

Referring to FIG. 8, the roll sizer embodiment depicted is: RIGHT HAND VIEW: Planer Head, core chucks, complete assembly.

Figure 9:
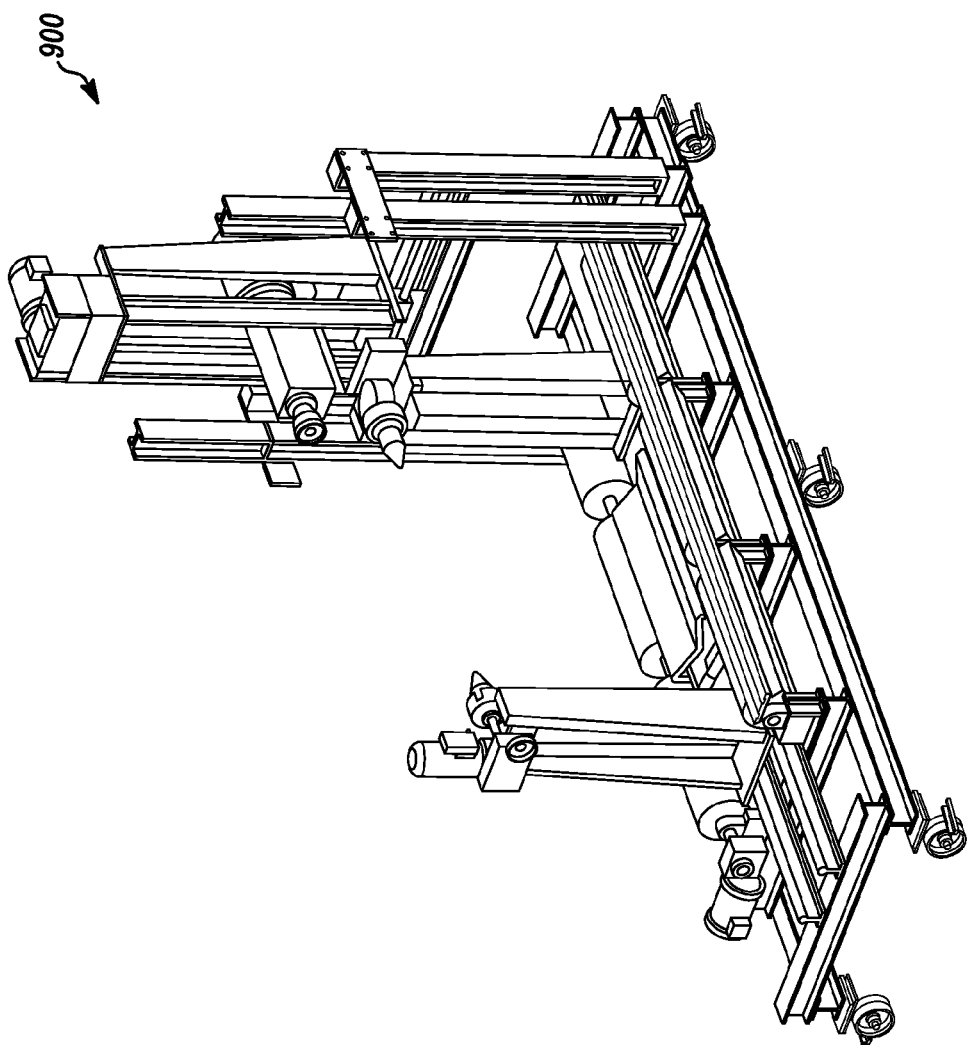
FIG. 9 depicts an embodiment of a roll sizing system: ISO VIEW: shell mill, core chucks, lift table.

Referring to FIG. 9, the roll sizer embodiment depicted is: ISO VIEW: shell mill, core chucks, lift table.

Figure 10:
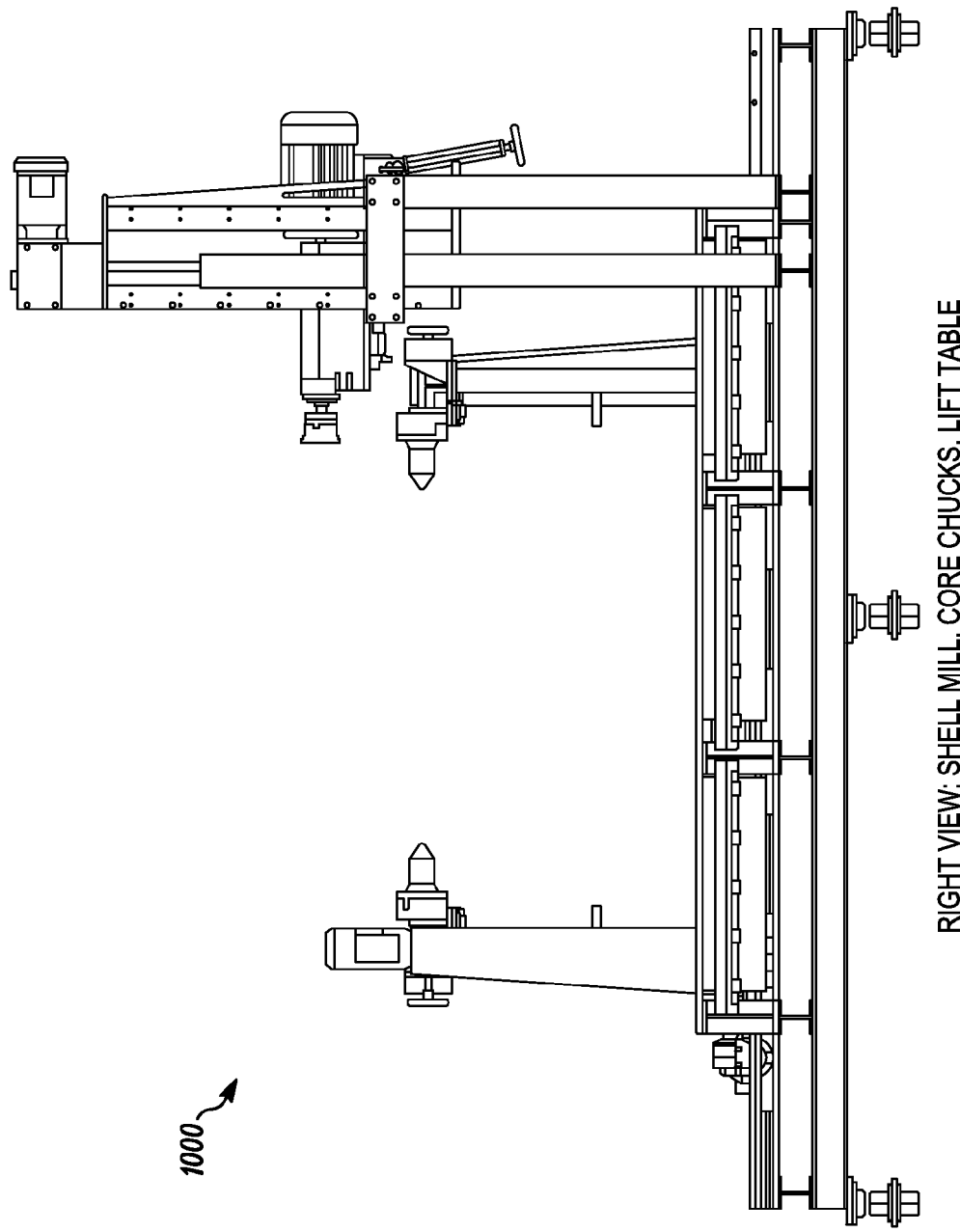
FIG. 10 depicts an embodiment of a roll sizing system: RIGHT VIEW: shell mill, core chucks, lift table.

Referring to FIG. 10, the roll sizer embodiment depicted is: RIGHT VIEW: shell mill, core chucks, lift table.

Figure 11:
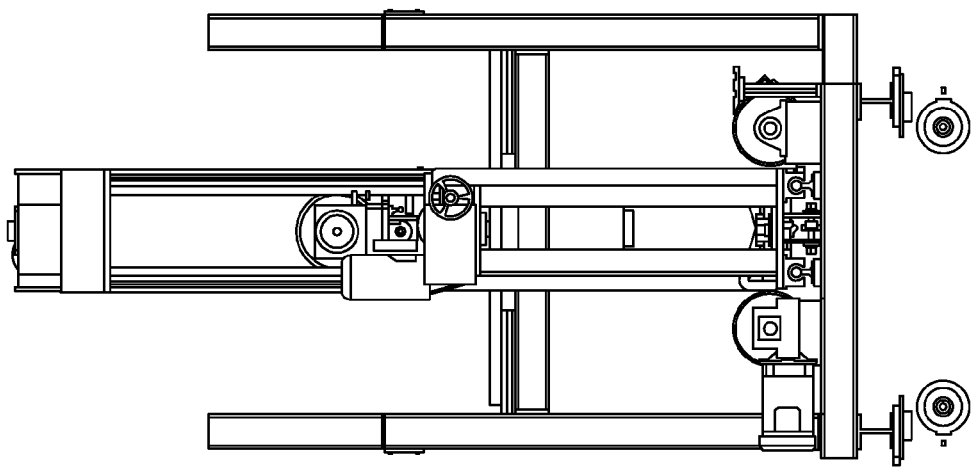
FIG. 11 depicts an embodiment of a roll sizing system: END VIEW: shell mill, core chucks, lift table, w/o saw or kickers.

Referring to FIG. 11, the roll sizer embodiment depicted is: END VIEW: shell mill, core chucks, lift table, w/o saw or kickers.

Figure 12:
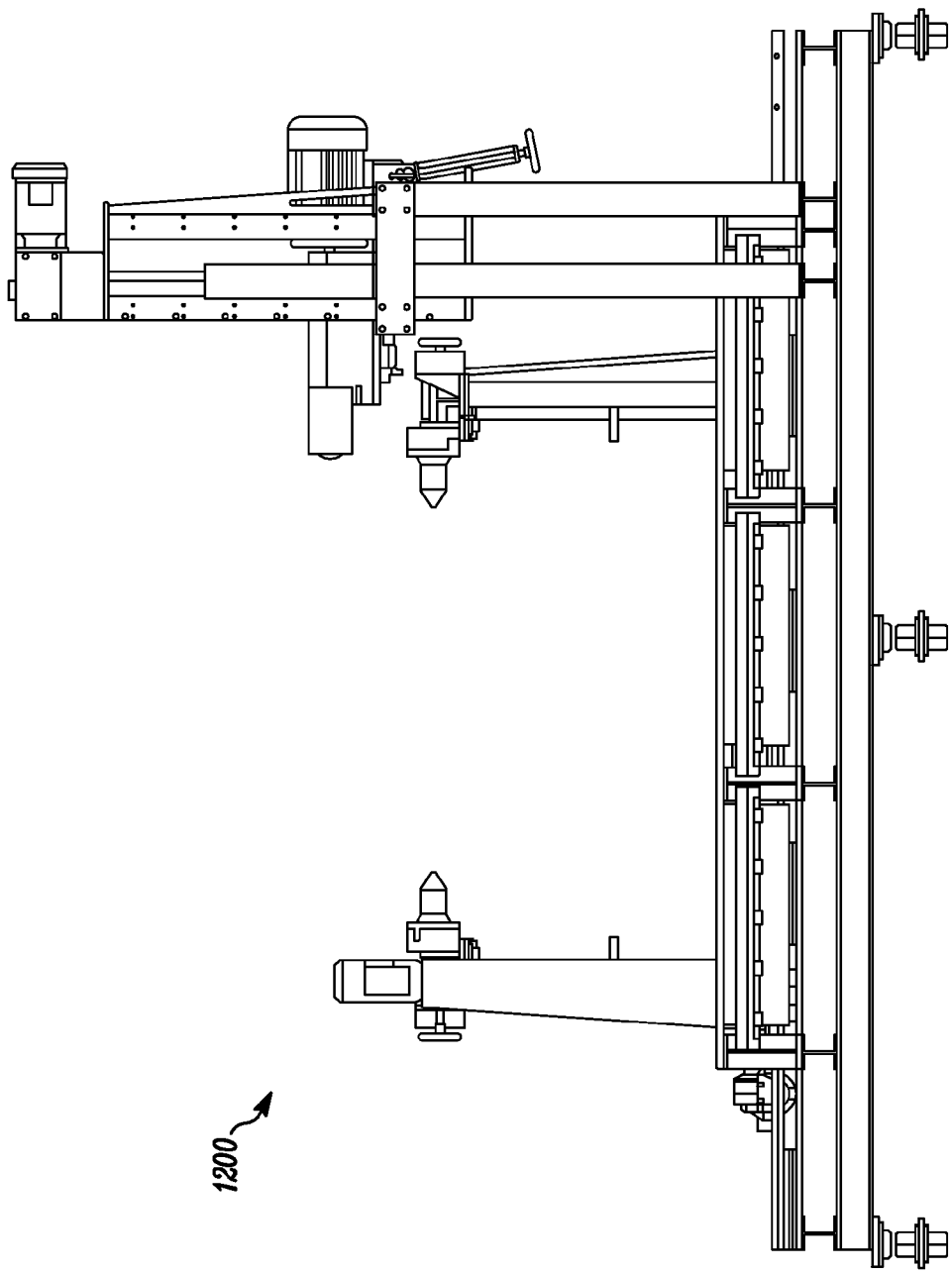
FIG. 12 depicts an embodiment of a roll sizing system: RIGHT VIEW: Planer Head, core chucks, lift table.

Referring to FIG. 12, the roll sizer embodiment depicted is: RIGHT VIEW: Planer Head, core chucks, lift table.

Figure 13:
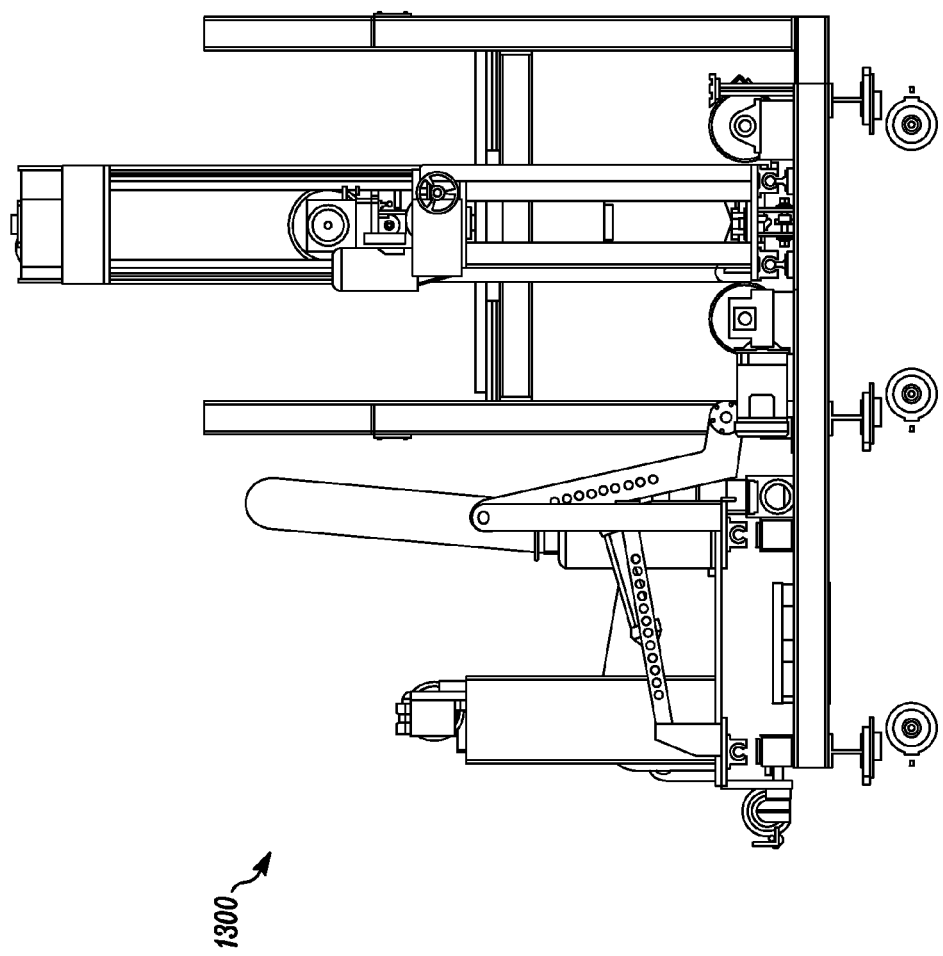
FIG. 13 depicts an embodiment of a roll sizing system: END VIEW: shell mill, shafted, complete assembly.

Referring to FIG. 13, the roll sizer embodiment depicted is: END VIEW: shell mill, shafted, complete assembly.

Figure 14:
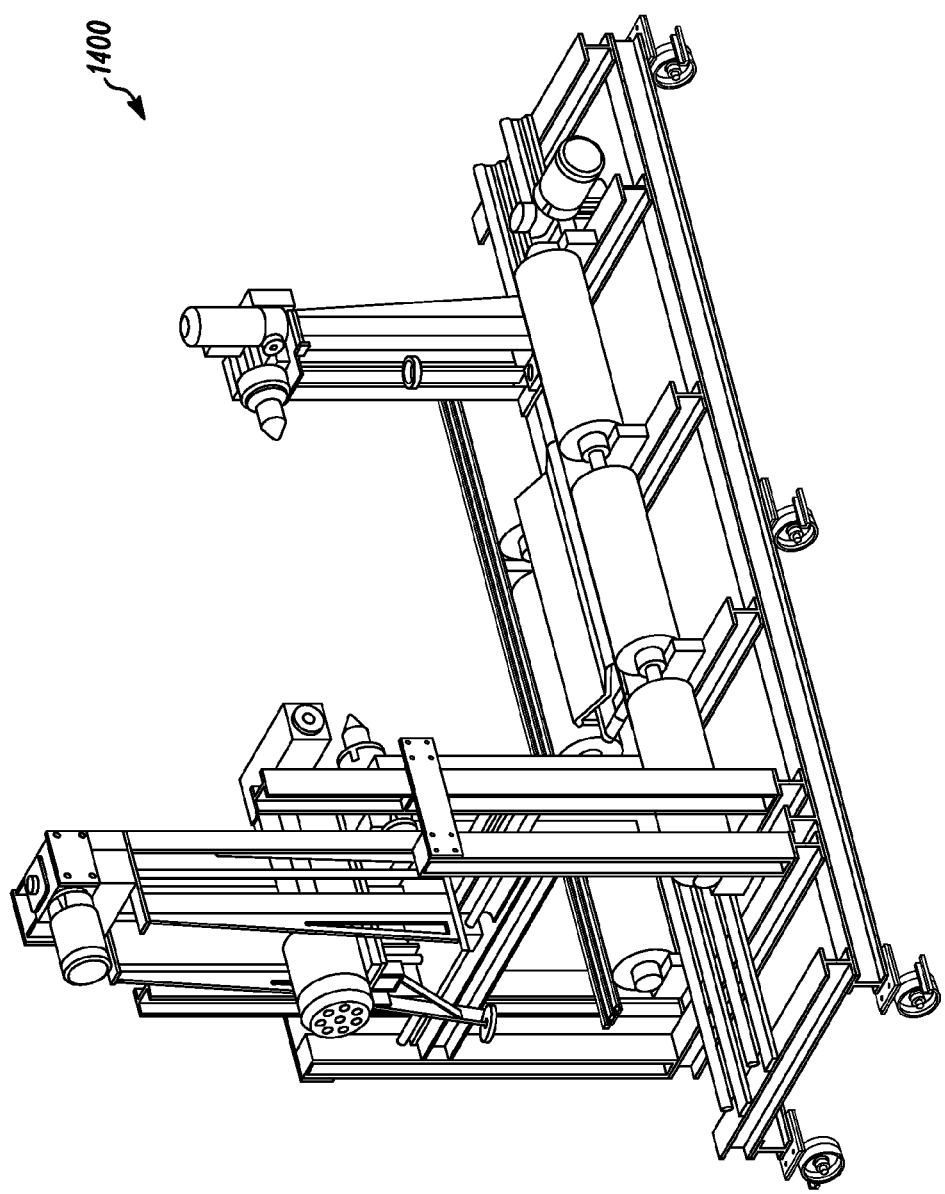
FIG. 14 depicts an embodiment of a roll sizing system: REAR ISO VIEW: Planer Head, core chucks, lift table.

Referring to FIG. 14, the roll sizer embodiment depicted is: REAR ISO VIEW: Planer Head, core chucks, lift table.

Figure 15:
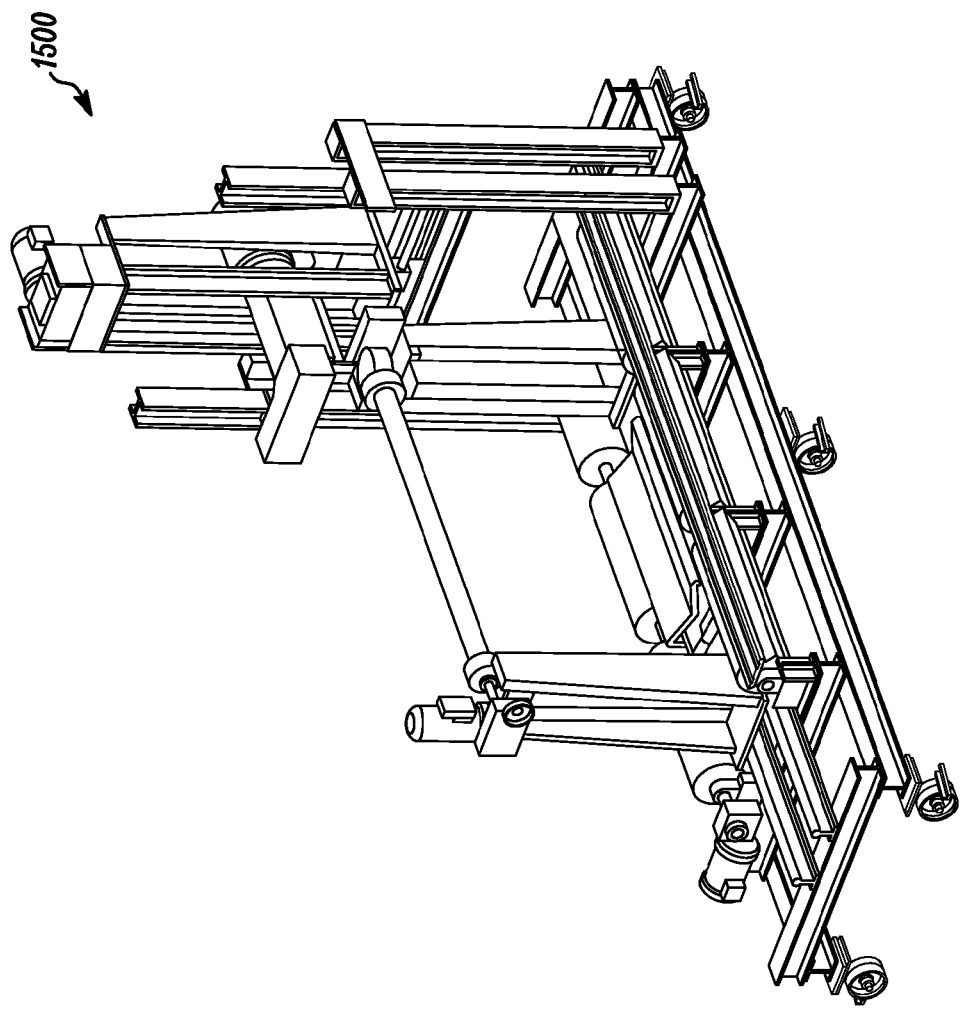
FIG. 15 depicts an embodiment of a roll sizing system: ISO VIEW: Planer Head, core chucks, lift table.

Referring to FIG. 15, the roll sizer embodiment depicted is: ISO VIEW: Planer Head, core chucks, lift table.

Figure 16:
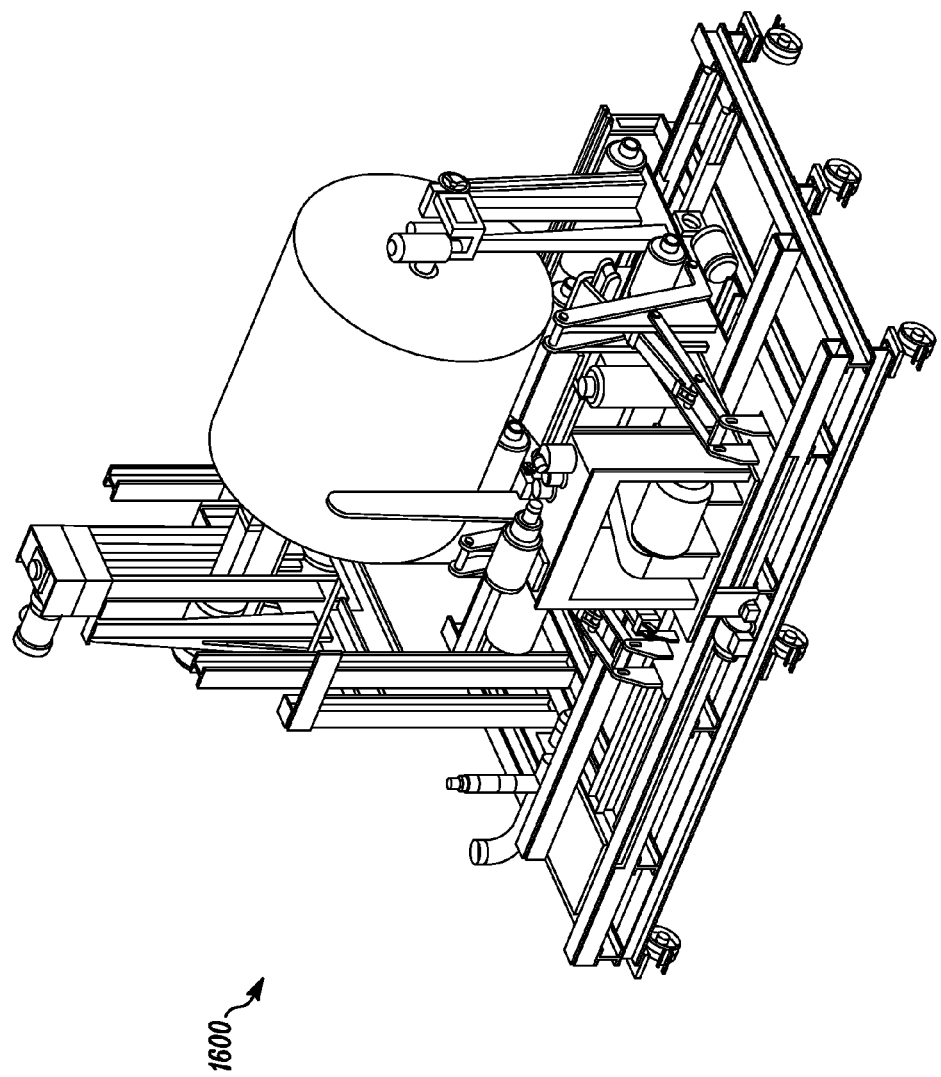
FIG. 16 depicts an embodiment of a roll sizing system: ISO VIEW: shell mill, shafted, complete assembly with paper roll.

Referring to FIG. 16, the roll sizer embodiment depicted is: ISO VIEW: shell mill, shafted, complete assembly with paper roll.

Figure 17:
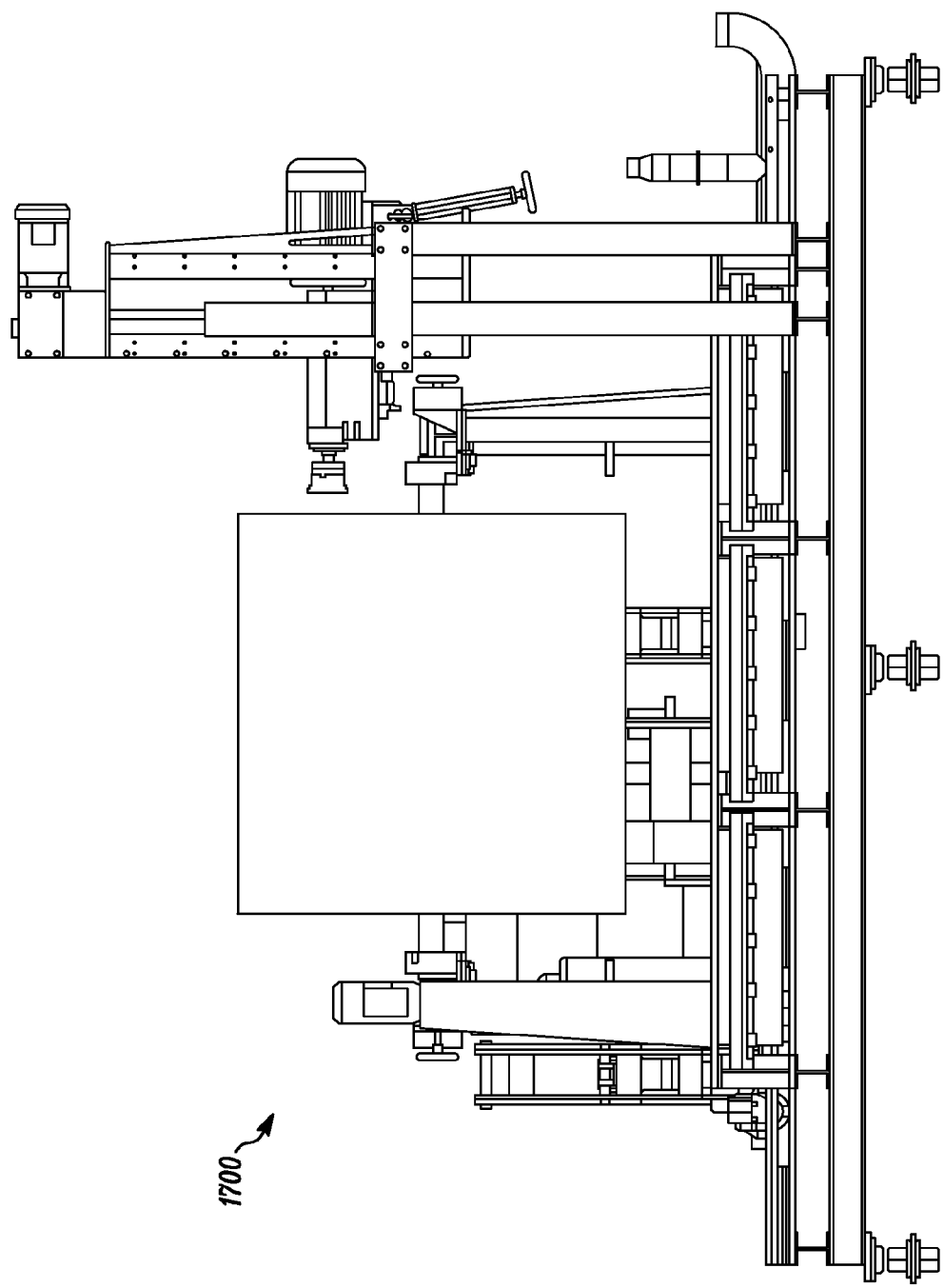
FIG. 17 depicts an embodiment of a roll sizing system: RIGHT HAND VIEW: shell mill, shafted, complete assembly with paper roll.

Referring to FIG. 17, the roll sizer embodiment depicted is: RIGHT HAND VIEW: shell mill, shafted, complete assembly with paper roll.

Figure 18:
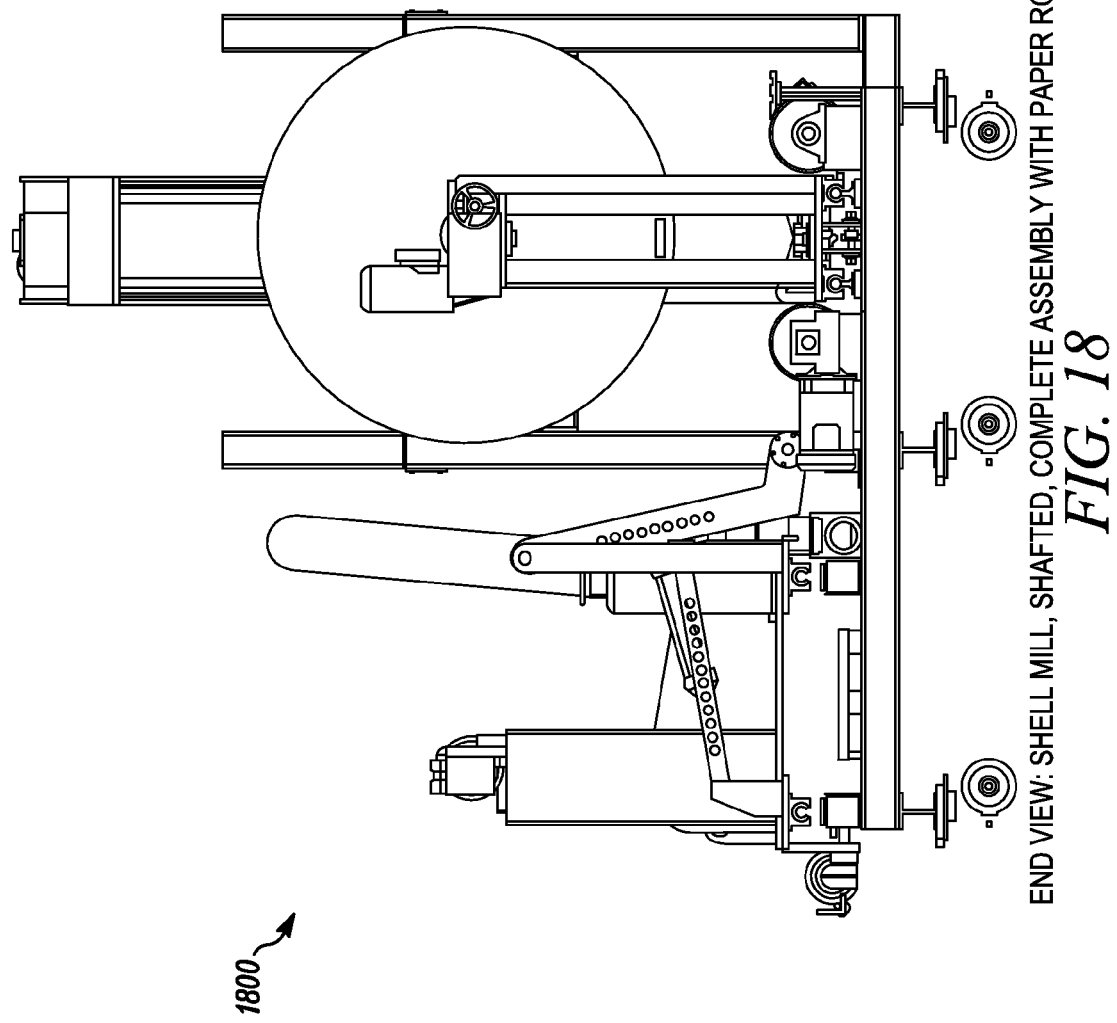
FIG. 18 depicts an embodiment of a roll sizing system: END VIEW: shell mill, shafted, complete assembly with paper roll.

Referring to FIG. 18, the roll sizer embodiment depicted is: END VIEW: shell mill, shafted, complete assembly with paper roll.

Figure 19:
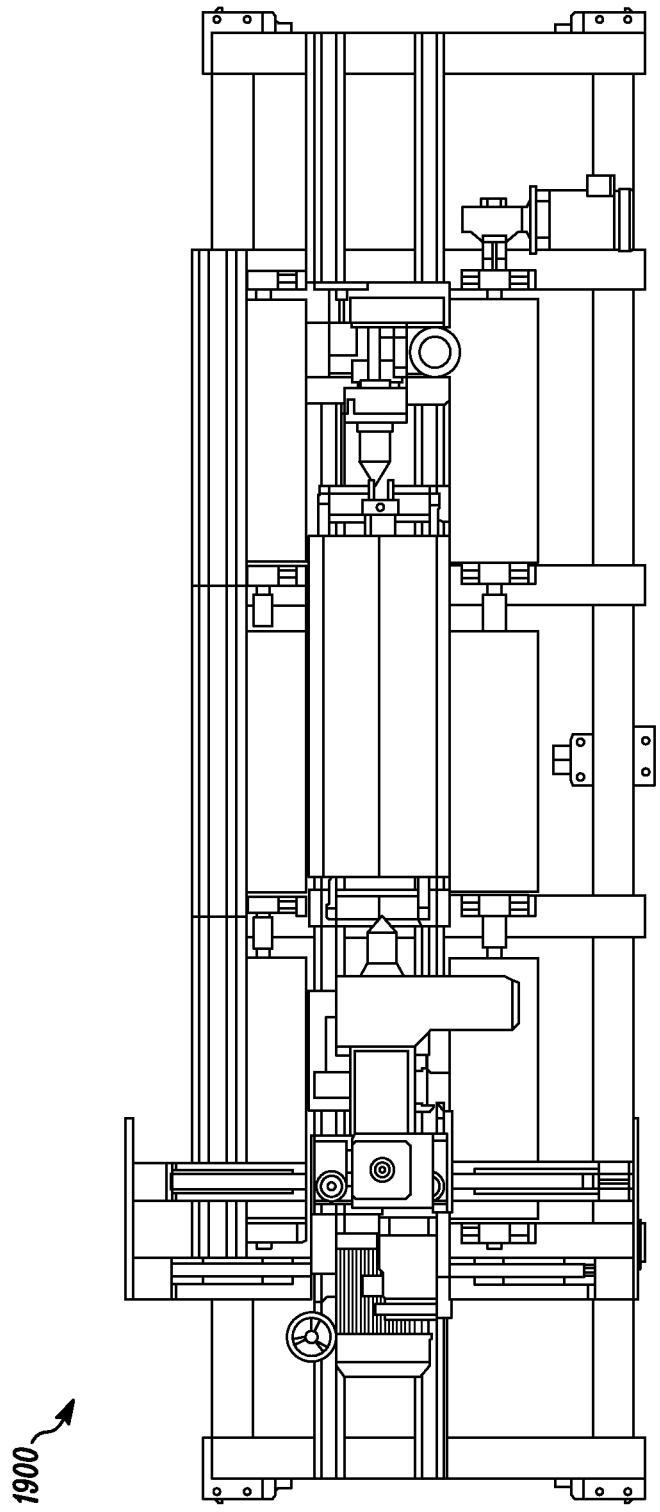
FIG. 19 depicts an embodiment of a roll sizing system: TOP VIEW: SHELIX mill, core chucks, lift table.

Referring to FIG. 19, the roll sizer embodiment depicted is: TOP VIEW: SHELIX mill, core chucks, lift table.

Figure 20:
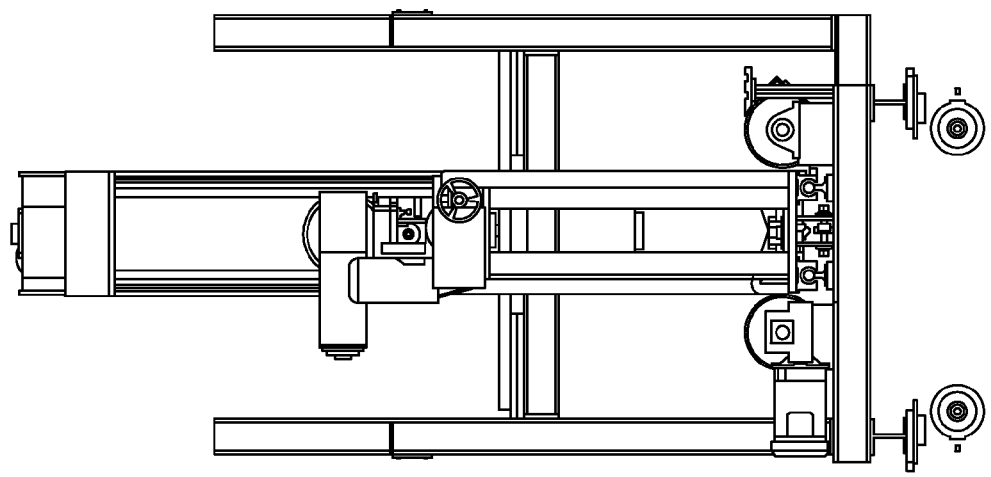
FIG. 20 depicts an embodiment of a roll sizing system: END VIEW: Planer Head, core chucks, lift table.

Referring to FIG. 20, the roll sizer embodiment depicted is: END VIEW: Planer Head, core chucks, lift table.

Figure 21:
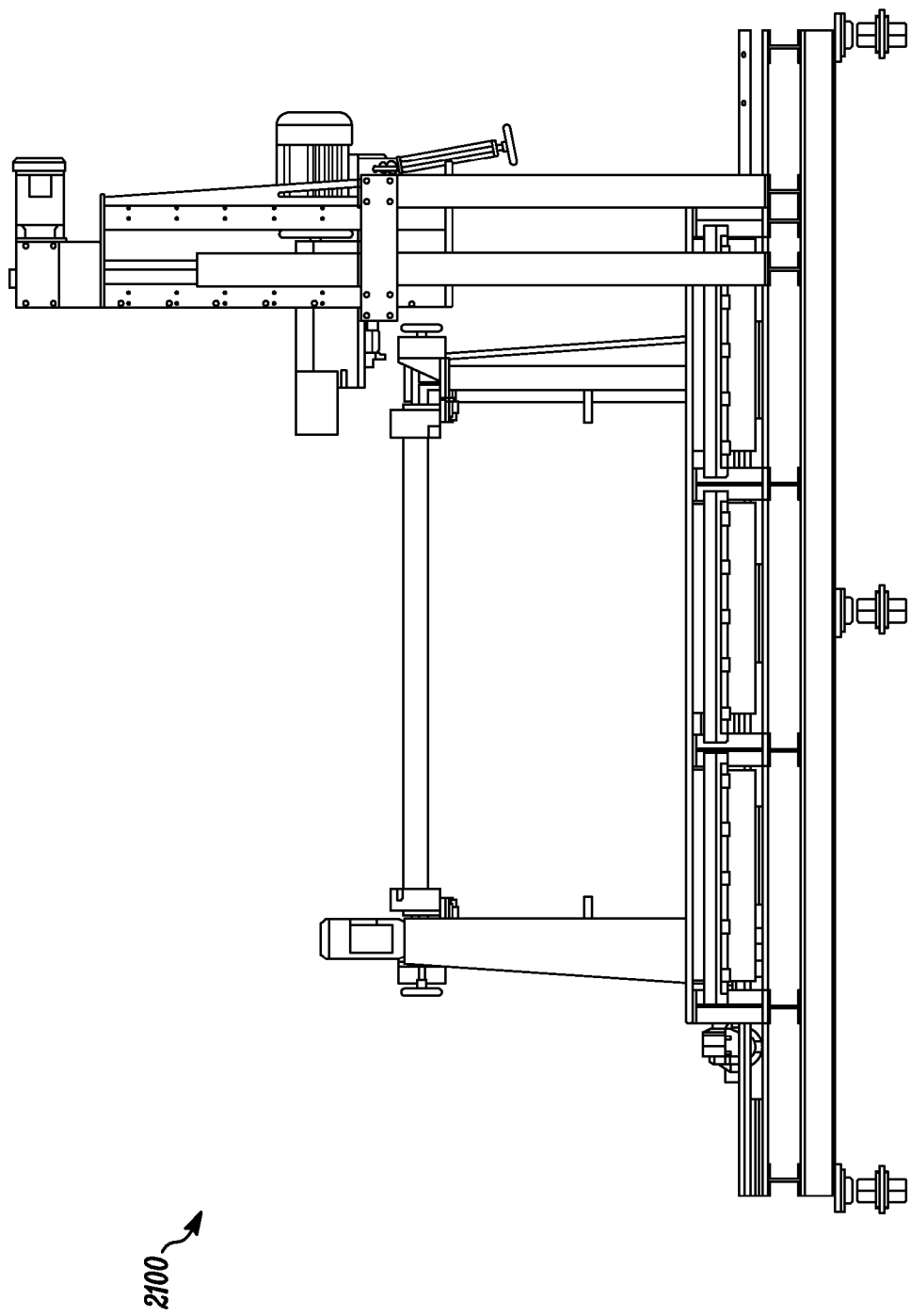
FIG. 21 depicts an embodiment of a roll sizing system: RIGHT VIEW: Planer Head, shafted, lift table.

Referring to FIG. 21, the roll sizer embodiment depicted is: RIGHT VIEW: Planer Head, shafted, lift table.

Figure 22:
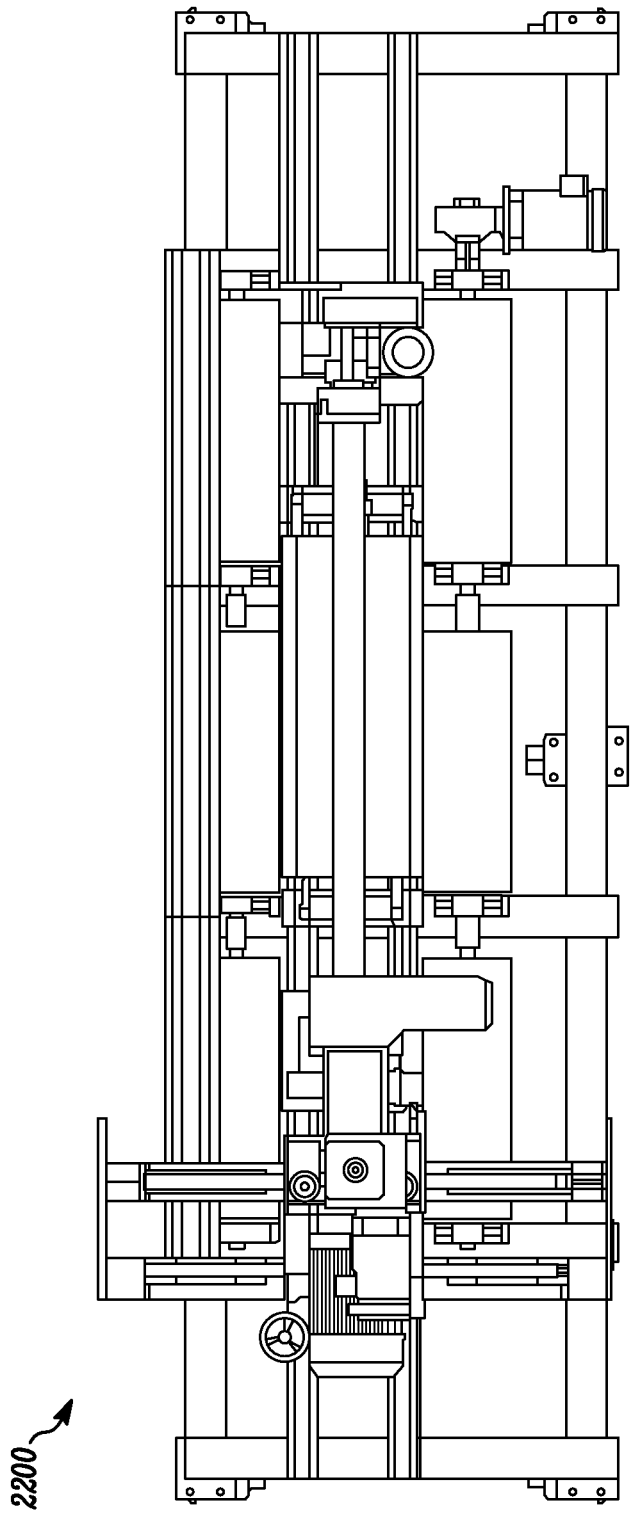
FIG. 22 depicts an embodiment of a roll sizing system: TOP VIEW: Planer Head, shafted, lift table.

Referring to FIG. 22, the roll sizer embodiment depicted is: TOP VIEW: Planer Head, shafted, lift table.

Figure 23:
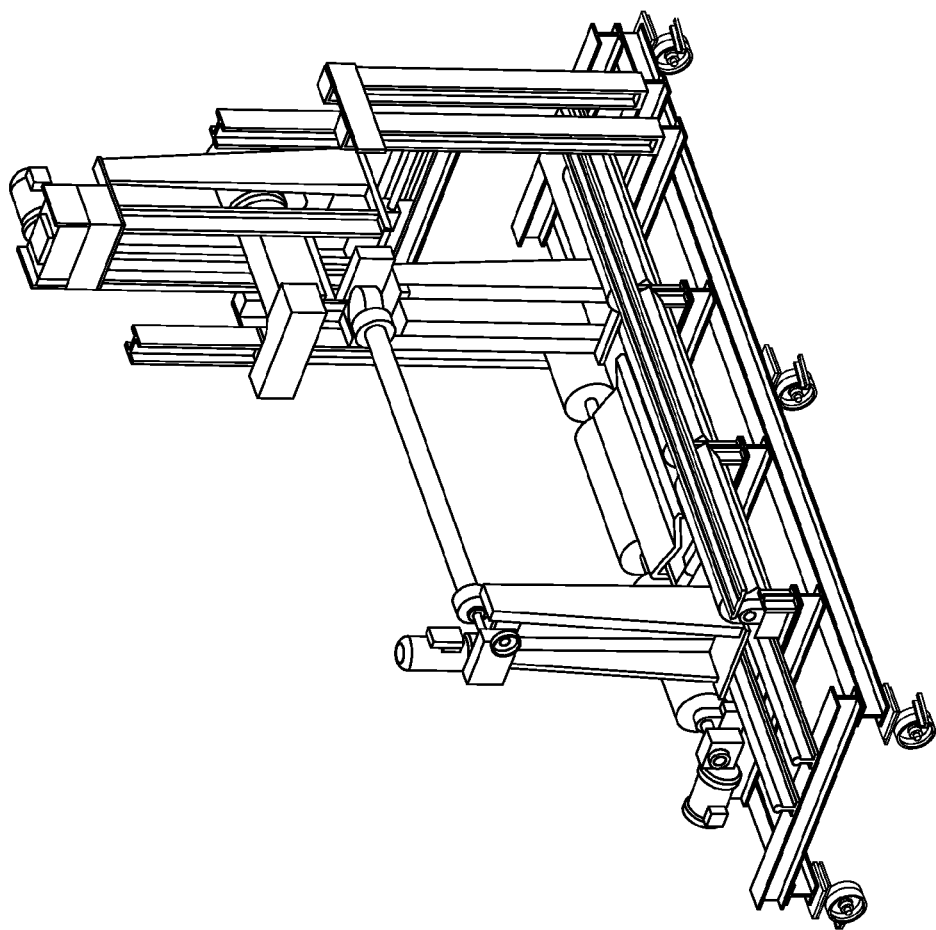
FIG. 23 depicts an embodiment of a roll sizing system: ISO VIEW: Planer Head, shafted, lift table.

Referring to FIG. 23, the roll sizer embodiment depicted is: ISO VIEW: Planer Head, shafted, lift table.

Figure 24:
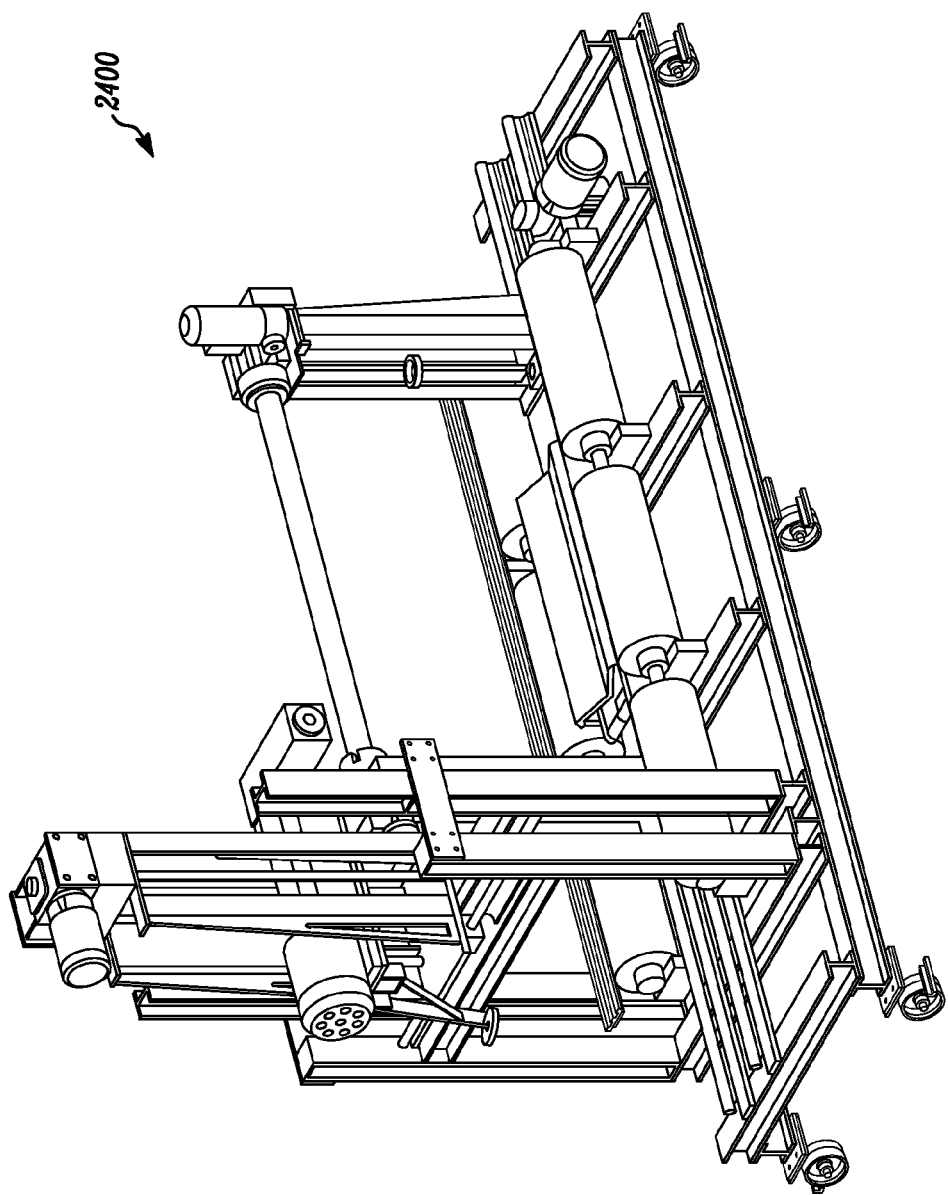
FIG. 24 depicts an embodiment of a roll sizing system: REAR ISO VIEW: Planer Head, shafted, lift table, w/o saw or kickers.

Referring to FIG. 24, the roll sizer embodiment depicted is: REAR ISO VIEW: Planer Head, shafted, lift table, w/o saw or kickers.

Figure 25:
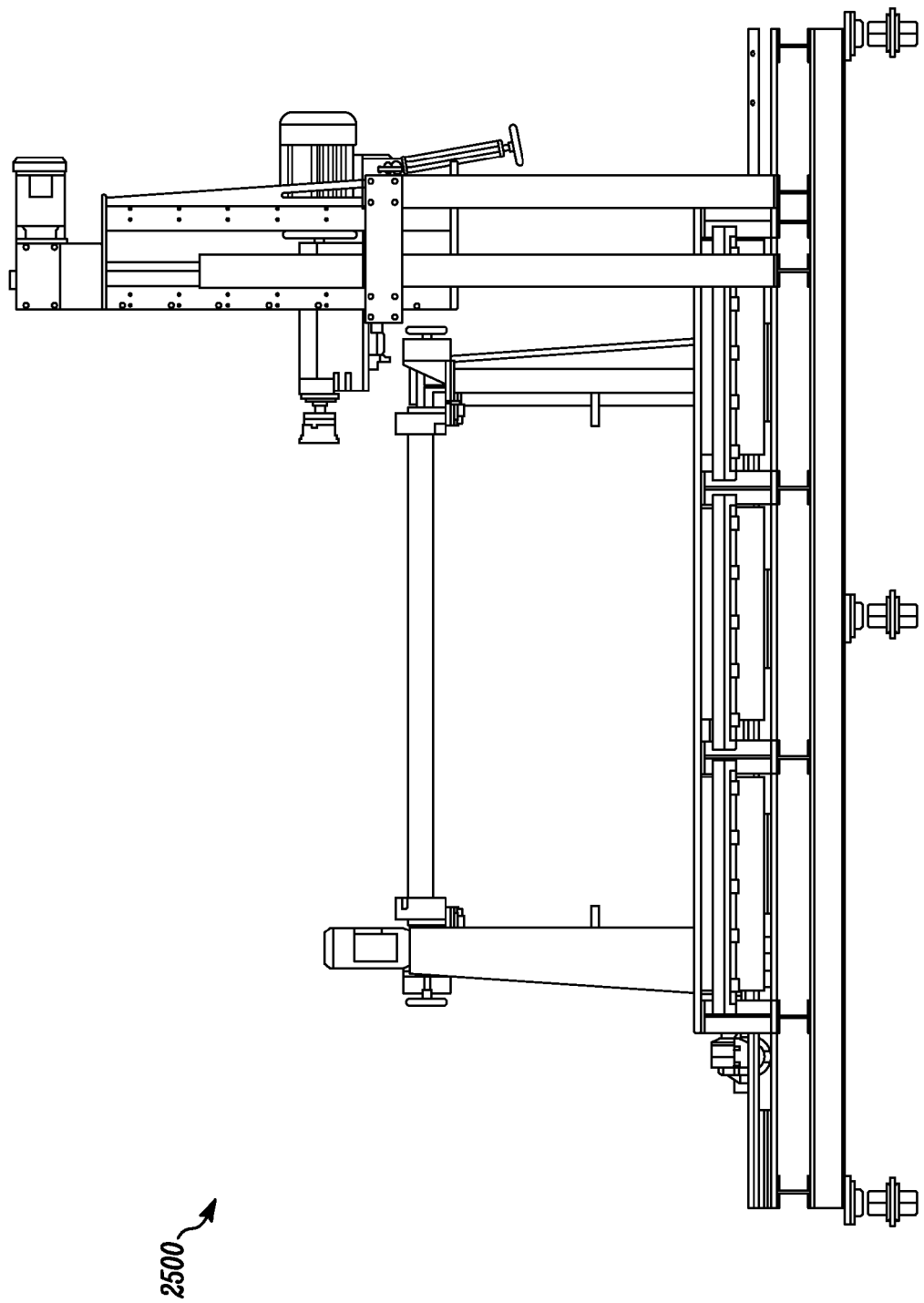
FIG. 25 depicts an embodiment of a roll sizing system: RIGHT VIEW: shell mill, shafted, lift table.

Referring to FIG. 25, the roll sizer embodiment depicted is: RIGHT VIEW: shell mill, shafted, lift table.

Figure 26:
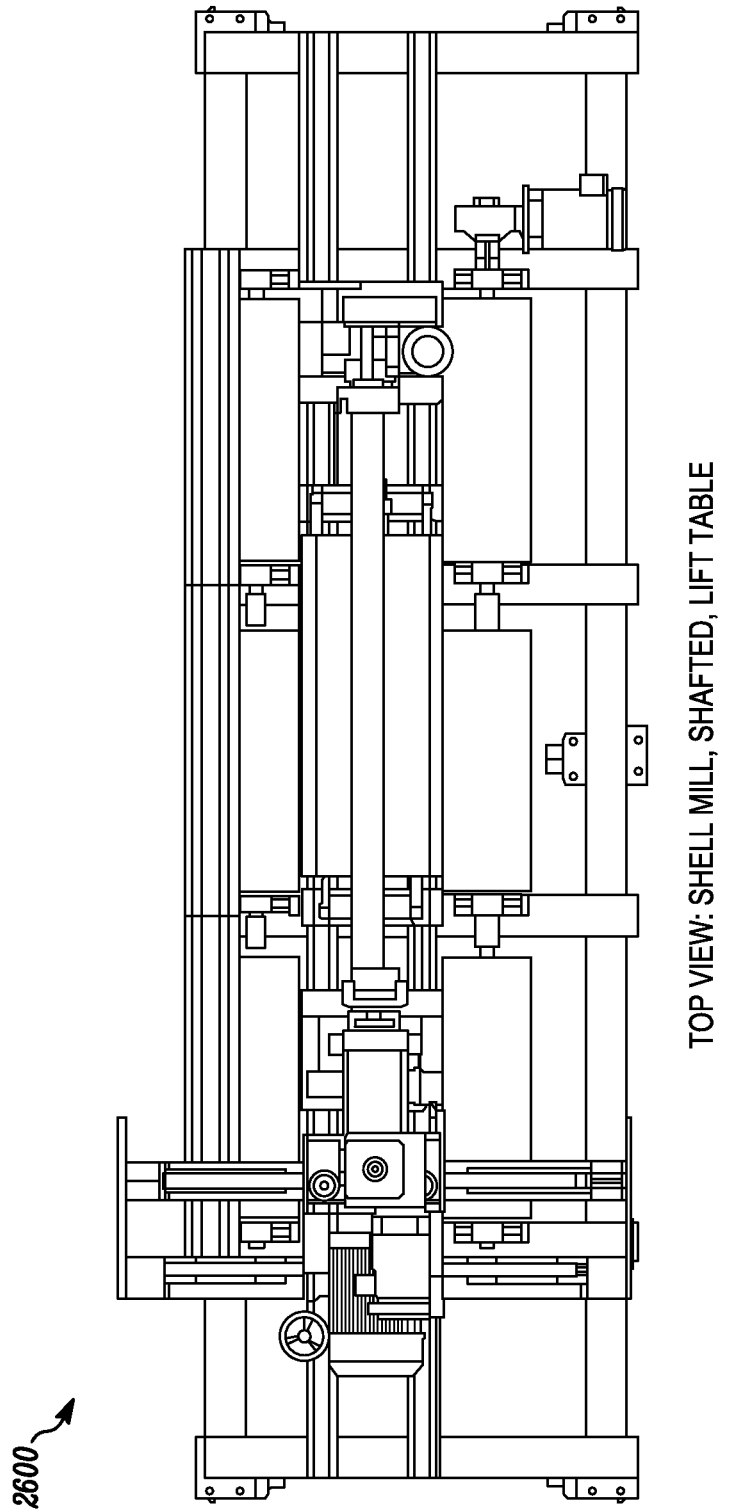
FIG. 26 depicts an embodiment of a roll sizing system: TOP VIEW: shell mill, shafted, lift table.

Referring to FIG. 26, the roll sizer embodiment depicted is: TOP VIEW: shell mill, shafted, lift table.

Figure 27:
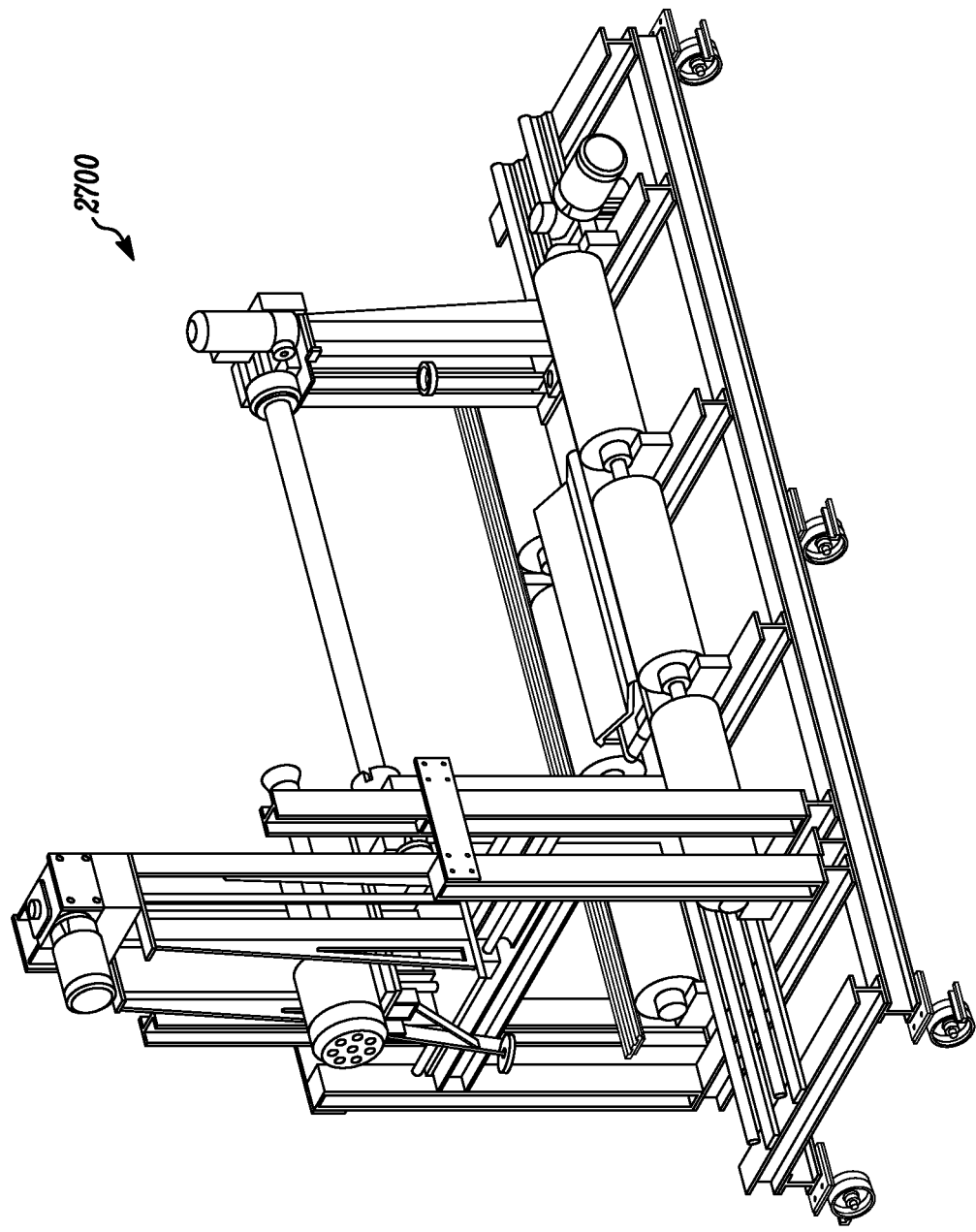
FIG. 27 depicts an embodiment of a roll sizing system: REAR ISO VIEW: shell mill, shafted, lift table, w/o saw or kickers.

Referring to FIG. 27, the roll sizer embodiment depicted is: REAR ISO VIEW: shell mill, shafted, lift table, w/o saw or kickers.

Figure 28:
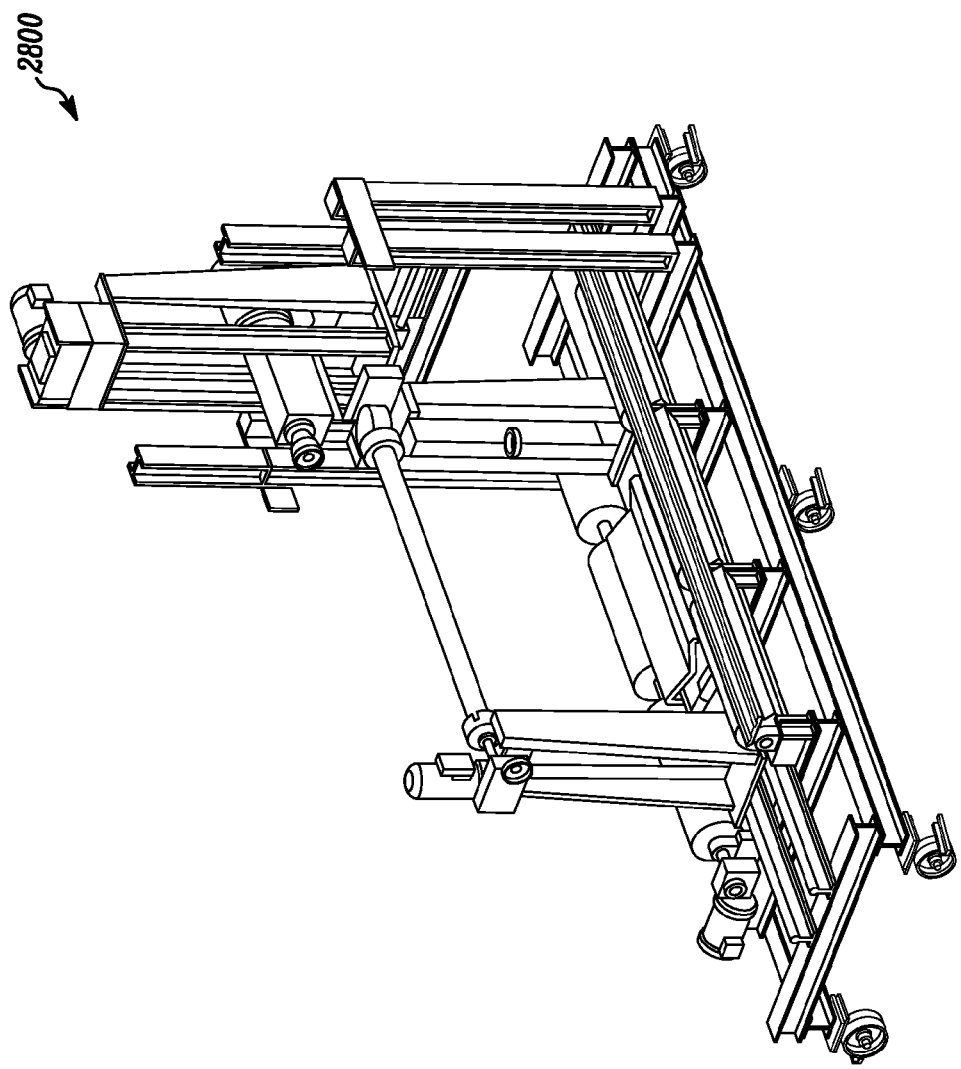
FIG. 28 depicts an embodiment of a roll sizing system: ISO VIEW: shell mill, shafted, lift table.

Referring to FIG. 28, the roll sizer embodiment depicted is: ISO VIEW: shell mill, shafted, lift table.

Figure 29:
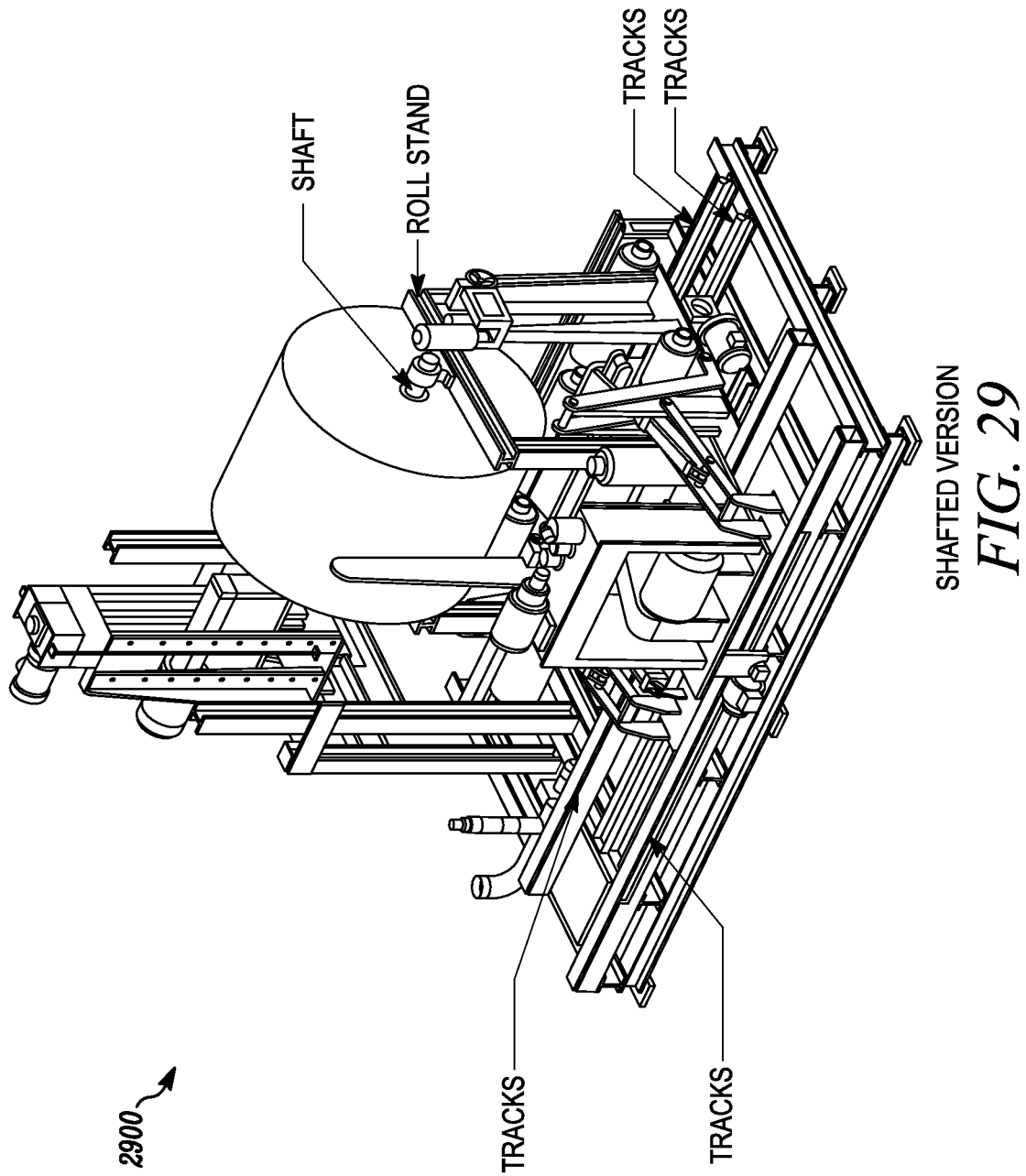
FIG. 29 depicts an embodiment of a roll sizing system a shafted version.

Referring to FIG. 29, the roll sizer embodiment depicted is a shafted version.

Figure 30:
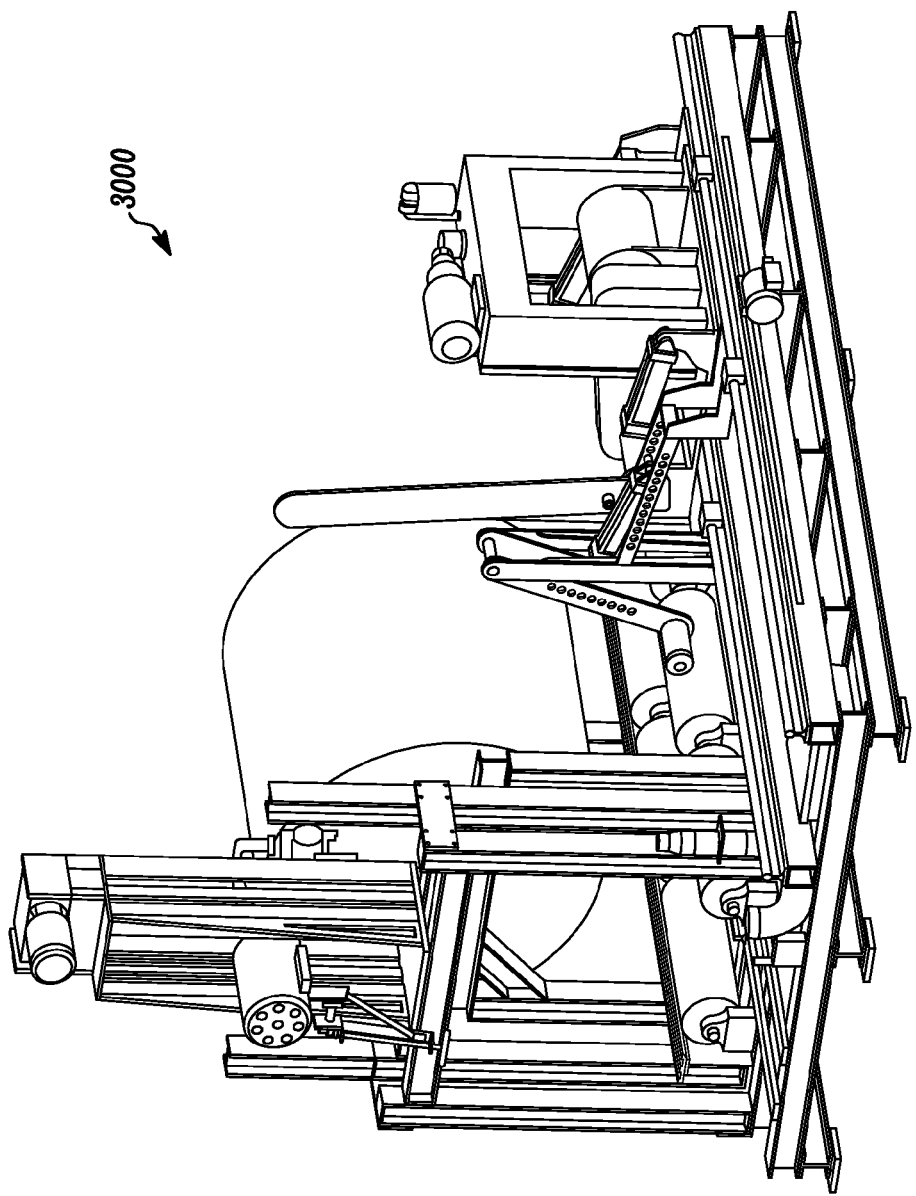
FIG. 30 depicts an embodiment of a roll sizing system mounted with a paper roll.

Referring to FIG. 30, the roll sizer embodiment depicted is mounted with a paper roll.

Figure 31:
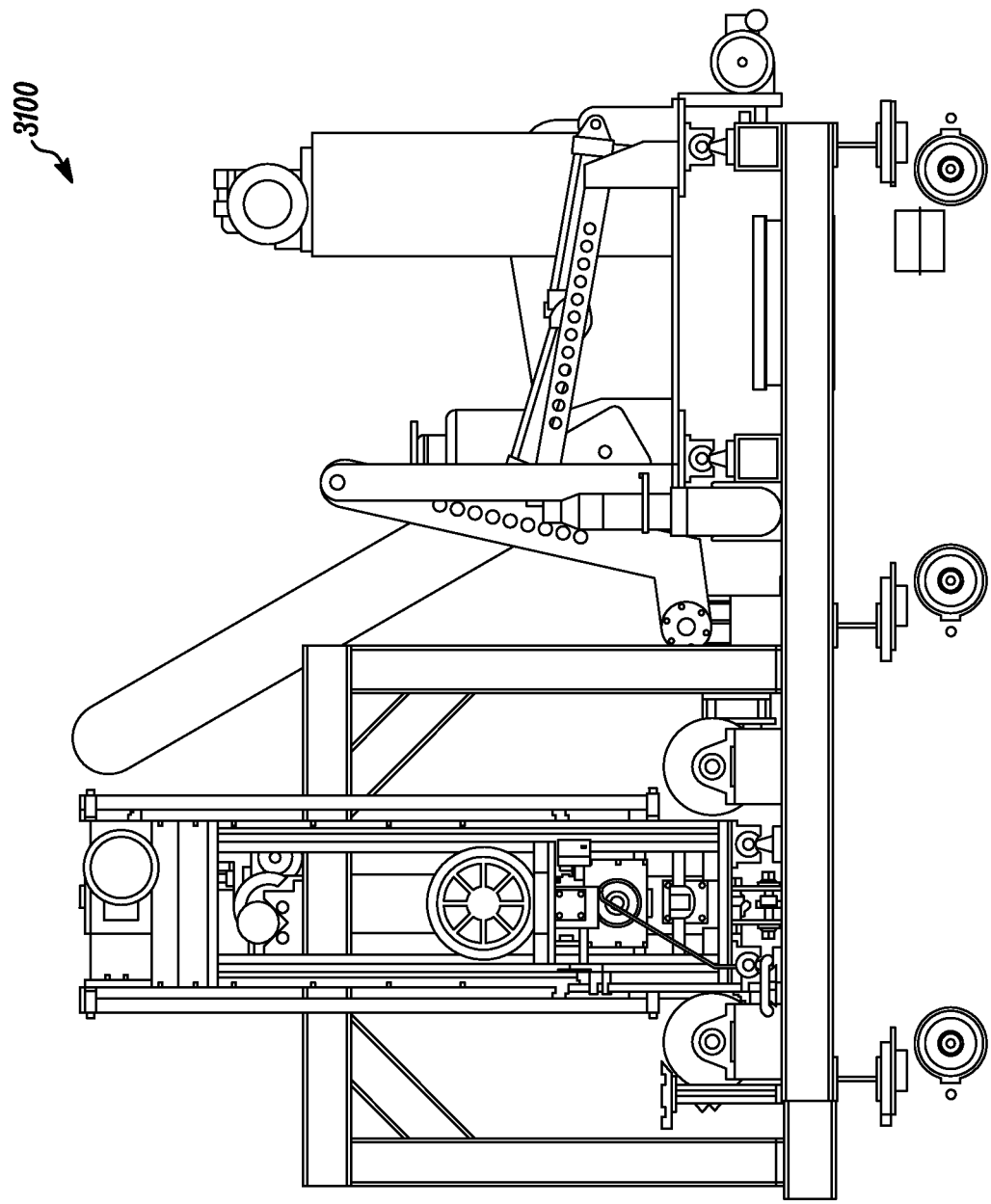
FIG. 31 depicts an embodiment of a roll sizing system a paper roll being cut by an adjustable laser.

Referring to FIG. 31, the roll sizer embodiment depicted is a paper roll being cut by an adjustable laser.

Figure 32:
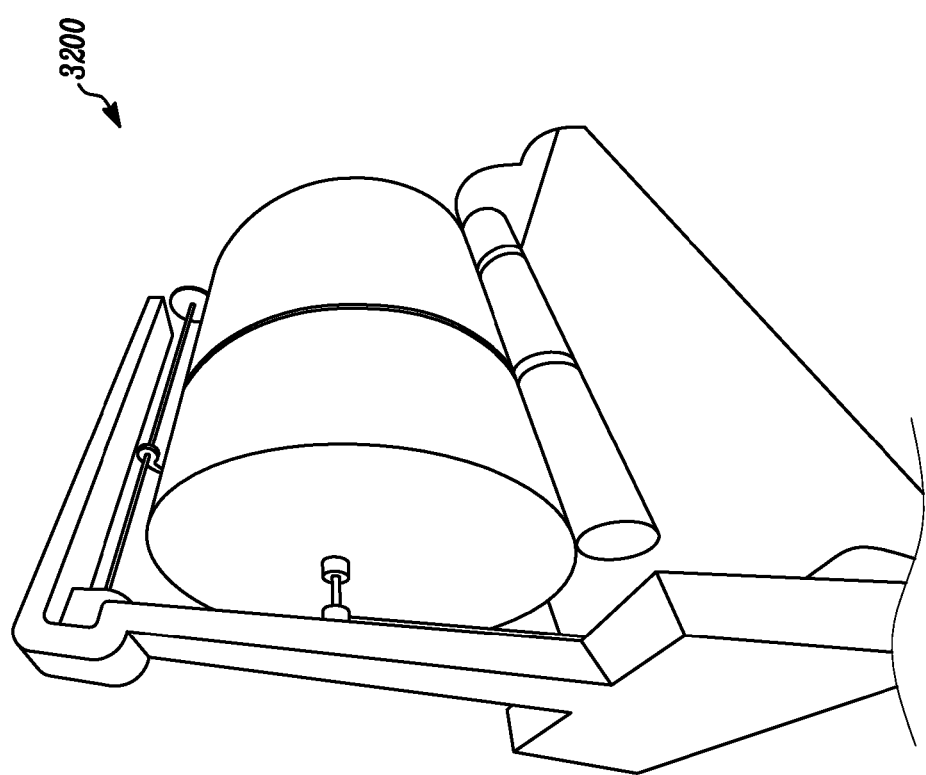
FIG. 32 depicts an embodiment of a roll sizing system an alternative embodiment whereby the spindle head is placed below the shaft or shaftless roll stand and resizing occurs from the bottom outside edge to the center or vice versa.

Referring to FIG. 32, the roll sizer embodiment depicted is an alternative embodiment whereby the spindle head is placed below the shaft or shaftless roll stand and resizing occurs from the bottom outside edge to the center or vice versa.

Referring to FIG. 33, top down (A), front (B), and side (C) views of the roll sizing system are shown.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A paper roll resizing system, comprising:
    a shafted roll stand that suspends a roll of paper mounted horizontally, wherein the shafted roll stand is fixed to a machine housing and is adapted to spin the roll of paper;
    a cutting arm movably mounted to the shafted roll stand, wherein the arm is adapted to hold a laser cutting tool; and
    a controller (PLC) that adjusts the position of the cutting arm with respect to the roll of paper held by the shafted roll stand, wherein the laser cutting tool is further adapted to check roundness of the paper roll.

2. A paper roll resizing system, comprising:
    a shafted roll stand that suspends a roll of paper mounted horizontally, wherein the shafted roll stand is fixed to a machine housing and is adapted to spin the roll of paper;
    a cutting arm movably mounted to the shafted roll stand, wherein the arm is adapted to hold a laser cutting tool; and
a controller (PLC) that adjusts the position of the cutting arm with respect to the roll of paper held by the shafted roll stand, wherein the arm rotates around the roll.

3. The system of claim 1, wherein the arm is fixed while the roll spins.

4. The system of claim 2, wherein the laser is further adapted to check roundness of the paper roll.

5. The system of claim 1, wherein the resizing system is portable.

6. The system of claim 1, wherein the PLC controls one or more of the depth of the cut, detailed roll specifications, selection of cutting tool, development of the cutting path, cutting tool rotation speed, speed of the head traveling along the face of the roll, an angle of a blade on the cutting tool or the angle of the cutting tool with respect to the roll end, shaft rotation speed and shaft rotation direction.

7. The system of claim 1, wherein the system is installed below floor level.

8. The system of claim 1, wherein the roll is lifted into position by a lift table or arms.

9. The system of claim 1, wherein sensors attached to the roll stand and electronically connected to the PLC determine at least one of if a roll is out-of-round, the distance to the roll from the cutting tool, and the depth of a cut.

10. The system of claim 2, wherein the resizing system is portable.

11. The system of claim 2, wherein the PLC controls one or more of the depth of the cut, detailed roll specifications, selection of cutting tool, development of the cutting path, cutting tool rotation speed, speed of the head traveling along the face of the roll, an angle of a blade on the cutting tool or the angle of the cutting tool with respect to the roll end, shaft rotation speed and shaft rotation direction.

12. The system of claim 2, wherein the system is installed below floor level.

13. The system of claim 2, wherein the roll is lifted into position by a lift table or arms.

14. The system of claim 2, wherein sensors attached to the roll stand and electronically connected to the PLC determine at least one of if a roll is out-of-round, the distance to the roll from the cutting tool, and the depth of a cut.

15. A paper roll resizing system, comprising:
    a shaftless roll stand that suspends a roll of paper mounted horizontally from two chucks on opposite ends of the roll, wherein the roll stand is fixed to a machine housing and is adapted to spin the roll of paper;
    a cutting tool movably mounted to the roll stand, wherein the cutting tool comprises at least one of a milling head, a planing head, a circular saw, and a laser cutting tool; and
    a controller (PLC) that adjusts the position of the cutting tool with respect to the roll of paper held by the roll stand, wherein the laser cutting tool is further adapted to check roundness of the paper roll.

16. The system of claim 15, wherein the PLC controls one or more of the depth of the cut, detailed roll specifications, selection of cutting tool, development of the cutting path, cutting tool rotation speed, speed of the head traveling along the face of the roll, an angle of a blade on the cutting tool or the angle of the cutting tool with respect to the roll end, shaft rotation speed and shaft rotation direction.

17. The system of claim 15, wherein the system is installed below floor level.

18. The system of claim 15, wherein the roll is lifted into position by a lift table or arms.

19. The system of claim 15, wherein sensors attached to the roll stand and electronically connected to the PLC determine at least one of if a roll is out-of-round, the distance to the roll from the cutting tool, and the depth of a cut.

20. The system of claim 15, wherein the resizing system is portable.

* * * * *